United States Patent
Cimberio et al.

(10) Patent No.: US 10,605,638 B2
(45) Date of Patent: Mar. 31, 2020

(54) ASSEMBLY INSTALLABLE IN AN AIR CONDITIONING AND/OR HEATING SYSTEM, AIR CONDITIONING AND/OR HEATING SYSTEM COMPRISING THE ASSEMBLY AND METHOD OF CONTROLLING THE ASSEMBLY

(71) Applicant: FIMCIM S.p.A., Milan (IT)

(72) Inventors: Roberto Cimberio, Ameno Fraz. Vacciago (IT); Tiziano Guidetti, Borgomanero (IT)

(73) Assignee: FIMCIM S.P.A., Milan (IT)

( * ) Notice: Subject to any disclaimer, the term of this patent is extended or adjusted under 35 U.S.C. 154(b) by 166 days.

(21) Appl. No.: 15/848,827

(22) Filed: Dec. 20, 2017

(65) Prior Publication Data
US 2018/0173250 A1    Jun. 21, 2018

(30) Foreign Application Priority Data

Dec. 21, 2016   (IT) .......................... 102016000129636
Mar. 13, 2017   (IT) .......................... 102017000027730

(51) Int. Cl.
*G01F 1/50*  (2006.01)
*G01F 1/42*  (2006.01)

(52) U.S. Cl.
CPC . *G01F 1/50* (2013.01); *G01F 1/42* (2013.01)

(58) Field of Classification Search
CPC .................................... G01F 1/42; G01F 1/50
See application file for complete search history.

(56) References Cited

U.S. PATENT DOCUMENTS

| 2,402,585 | A |   | 6/1946 | Allison |
| 2,701,704 | A | * | 2/1955 | Lawrence ............... F16K 21/16 251/25 |
| 3,182,677 | A |   | 5/1965 | Thiem |
| 3,814,998 | A | * | 6/1974 | Thoma .................. G01L 9/0072 361/283.4 |
| 4,098,296 | A |   | 7/1978 | Grasso et al. |
| 4,909,476 | A |   | 3/1990 | Messick |

(Continued)

FOREIGN PATENT DOCUMENTS

| DE | 24 14 713 | 10/1975 |
| EP | 1 900 986 | 3/2008 |

(Continued)

*Primary Examiner* — Eric Keasel
(74) *Attorney, Agent, or Firm* — Nixon & Vanderhye P.C.

(57) ABSTRACT

An assembly installable in an air conditioning and/or heating system of a room including a body (7) having an inlet opening (7a), an outlet opening (7z) and a channel (70) providing fluid communication between the inlet and outlet openings (7a, 7z). An orifice in the body (7) and shaped such that when a flow runs through the channel (70) between the inlet opening (7a) and the outlet opening (7z), a pressure difference is generated between the first region (7p) and the second region (7s) within the body (7), the first region (7p) being located upstream of the orifice, the second region (7s) downstream of the orifice. The assembly includes a meter (1) for detecting the pressure difference and a variator of at least one geometric feature of the orifice, the variator being able to arrange the orifice in different configurations, each corresponding to a respective geometric feature of the orifice.

20 Claims, 13 Drawing Sheets

(56) References Cited

U.S. PATENT DOCUMENTS

| | | | | |
|---|---|---|---|---|
| 4,918,994 A | * | 4/1990 | Kramer | G01F 1/363 |
| | | | | 73/861.53 |
| 6,053,055 A | | 4/2000 | Nelson | |
| 8,613,607 B2 | * | 12/2013 | Darsey | F04B 39/0055 |
| | | | | 251/205 |
| 2014/0042251 A1 | | 2/2014 | Maksymec et al. | |

FOREIGN PATENT DOCUMENTS

| | | |
|---|---|---|
| EP | 2 583 614 | 4/2013 |
| EP | 1 834 116 | 10/2013 |
| EP | 2 052 664 | 6/2015 |
| EP | 2 955 423 | 12/2015 |
| EP | 1458277 | 11/2016 |
| WO | WO 97/28390 | 8/1997 |
| WO | WO 2007/093046 | 8/2007 |
| WO | WO 2009/052284 | 4/2009 |

\* cited by examiner

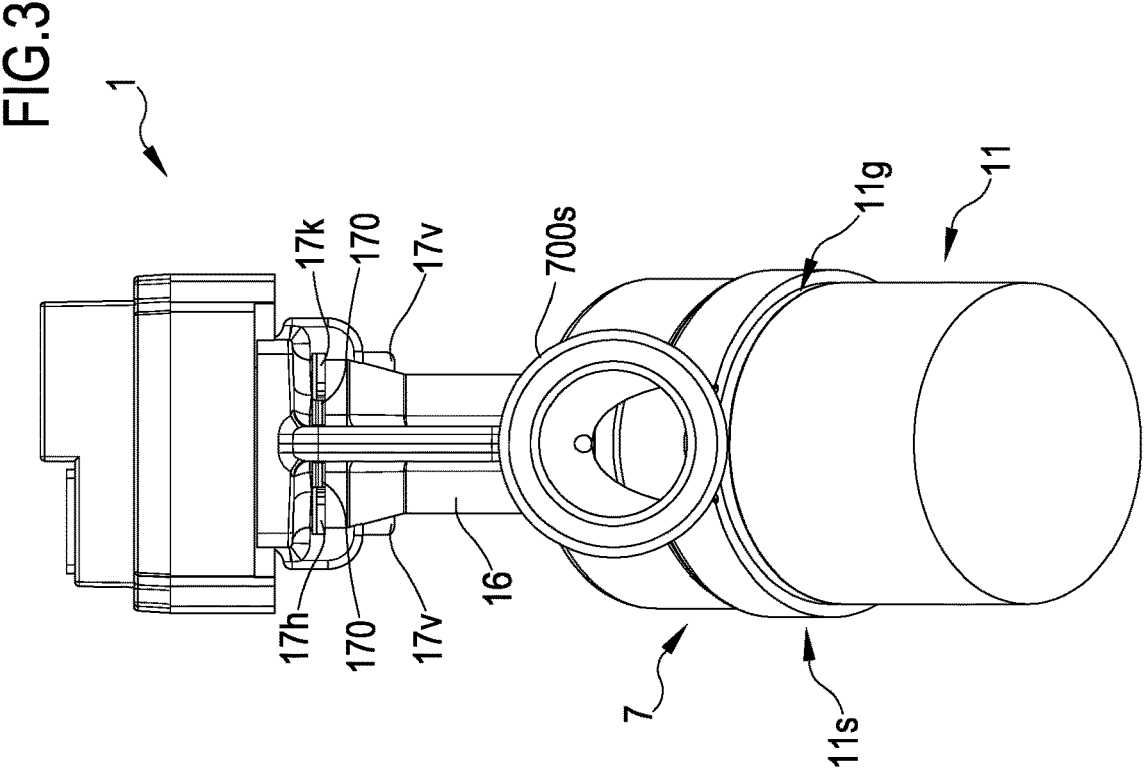
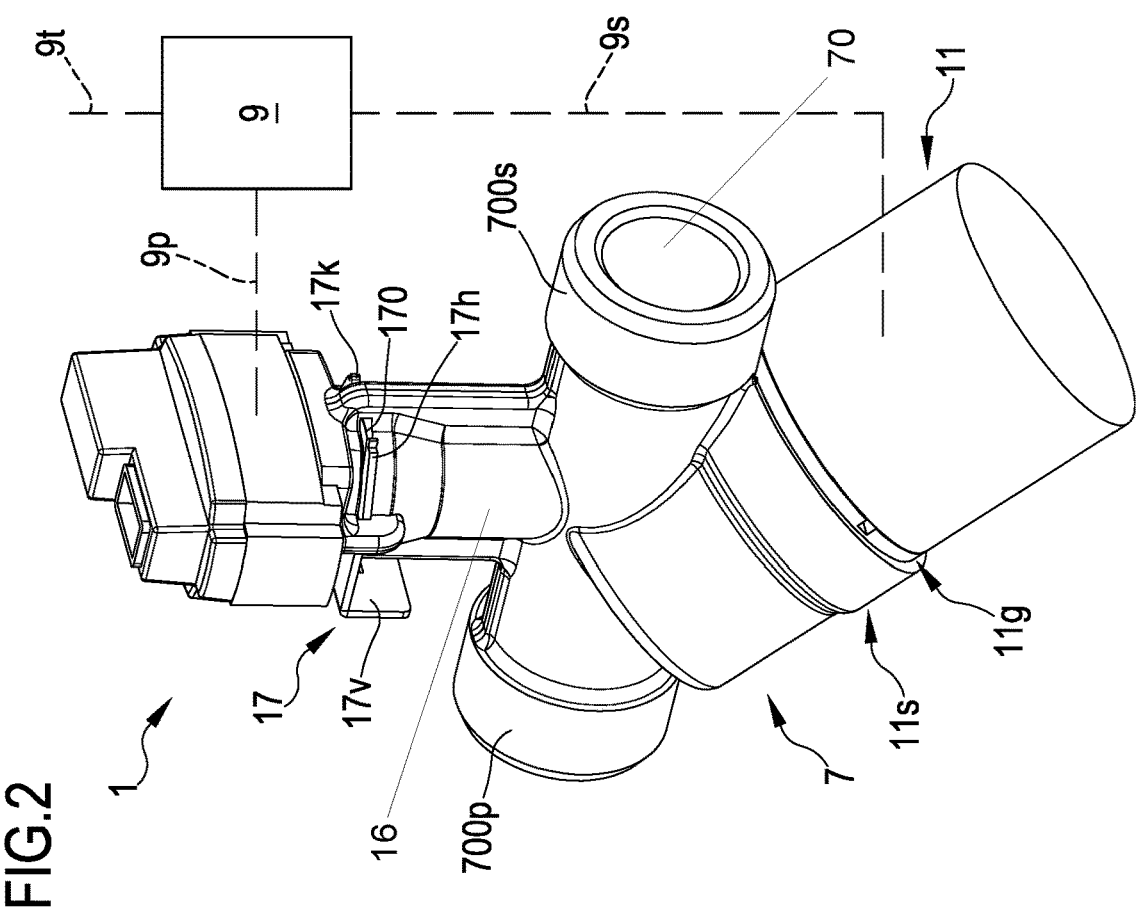

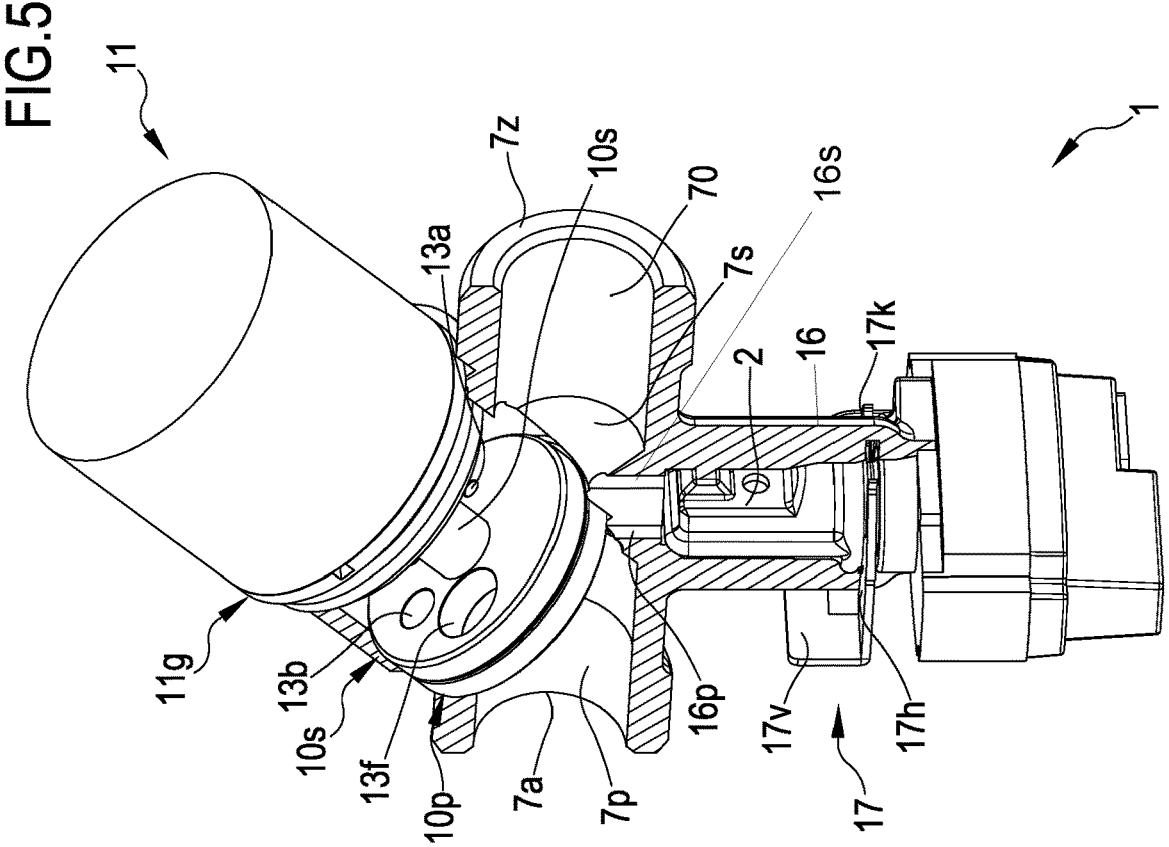
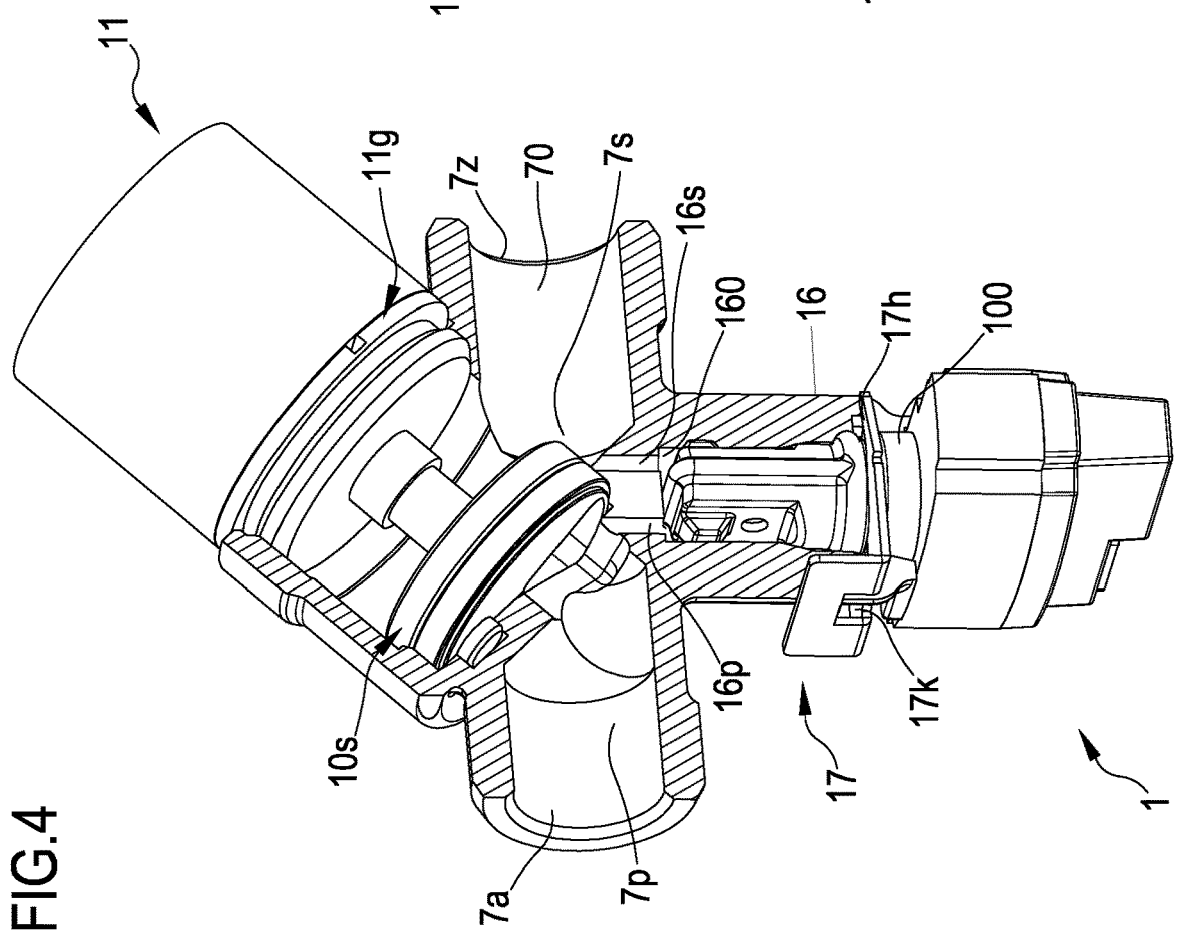

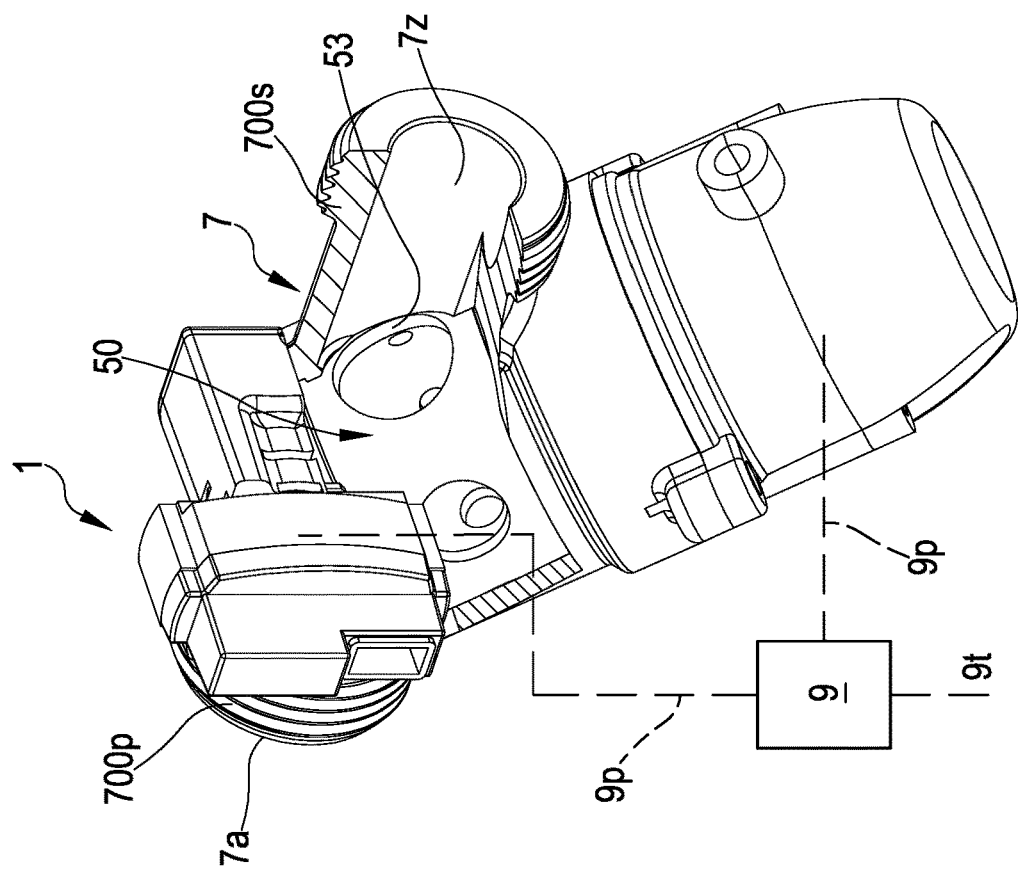
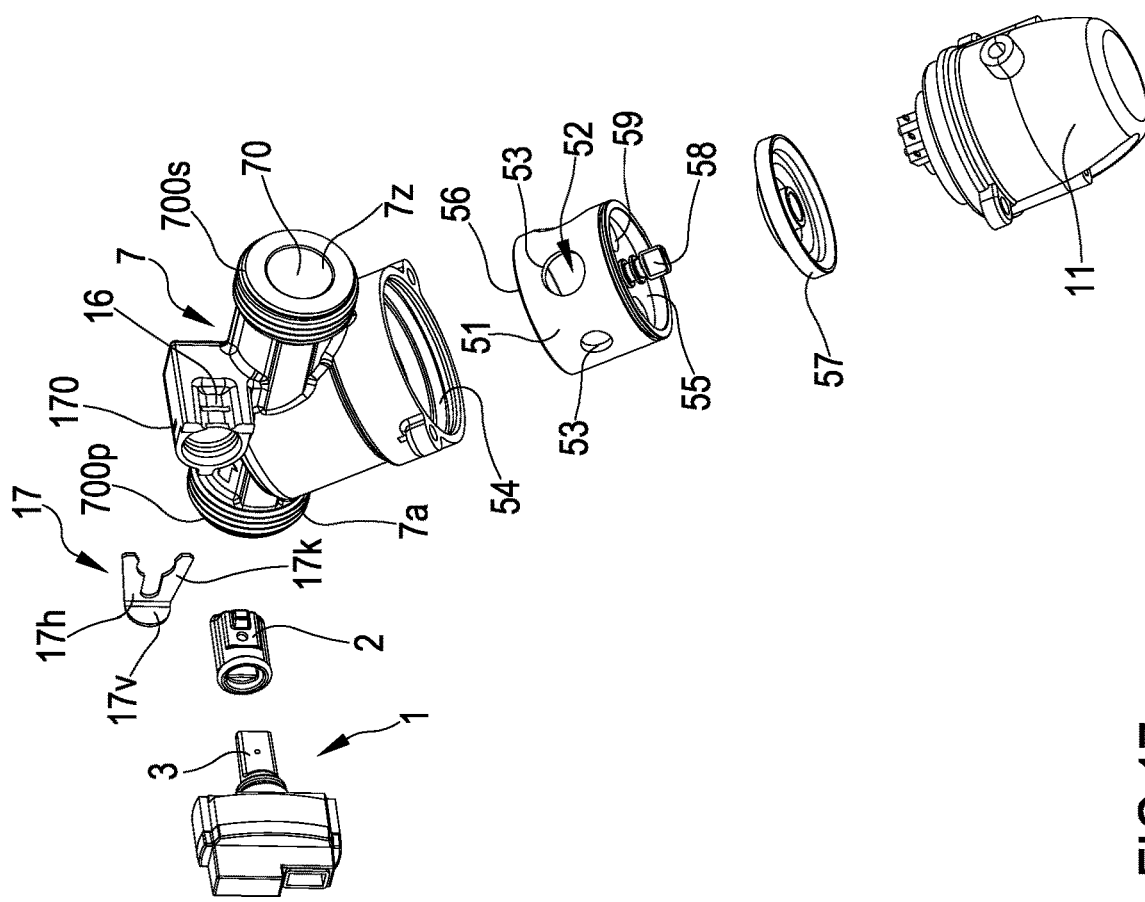

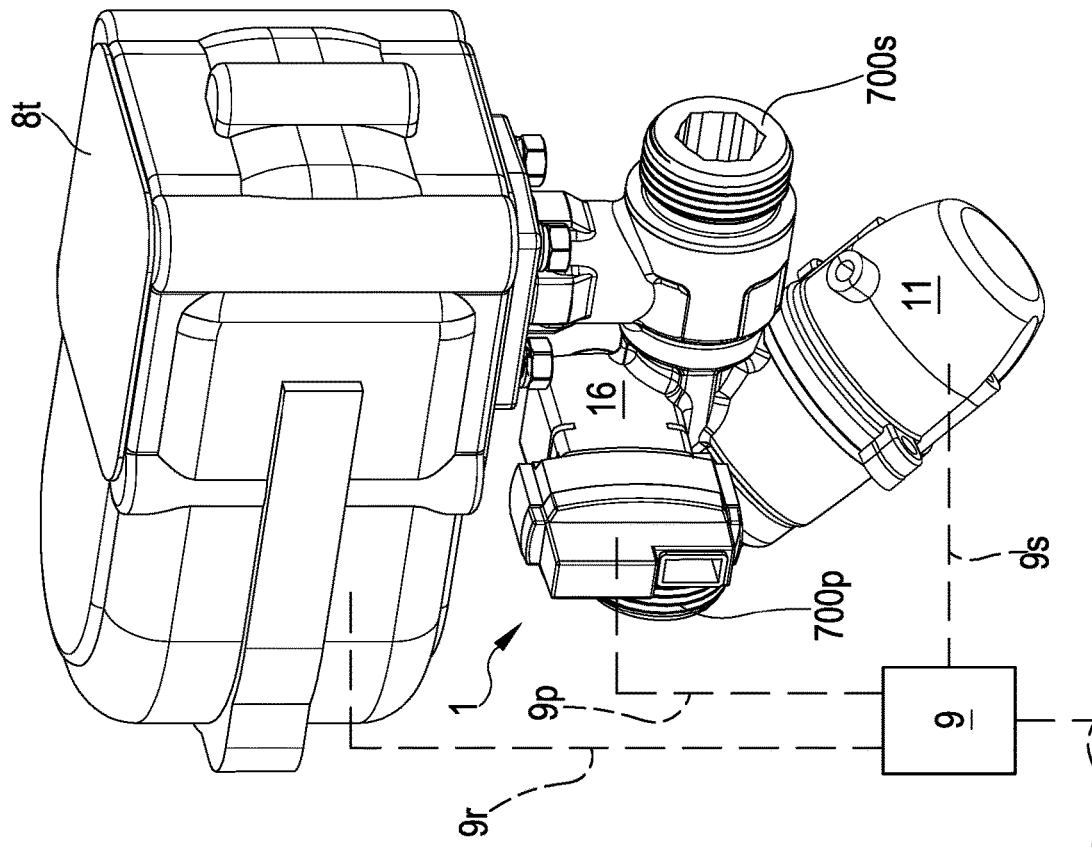
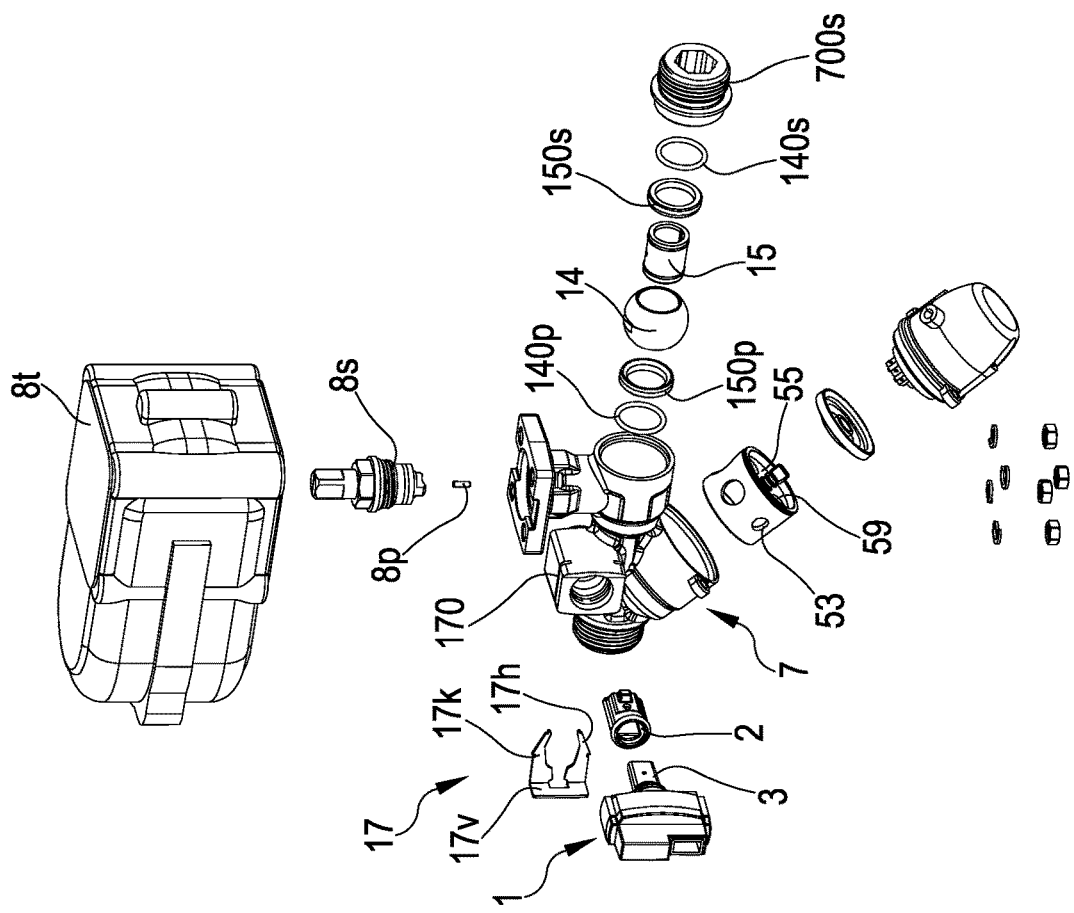
FIG.20
FIG.19

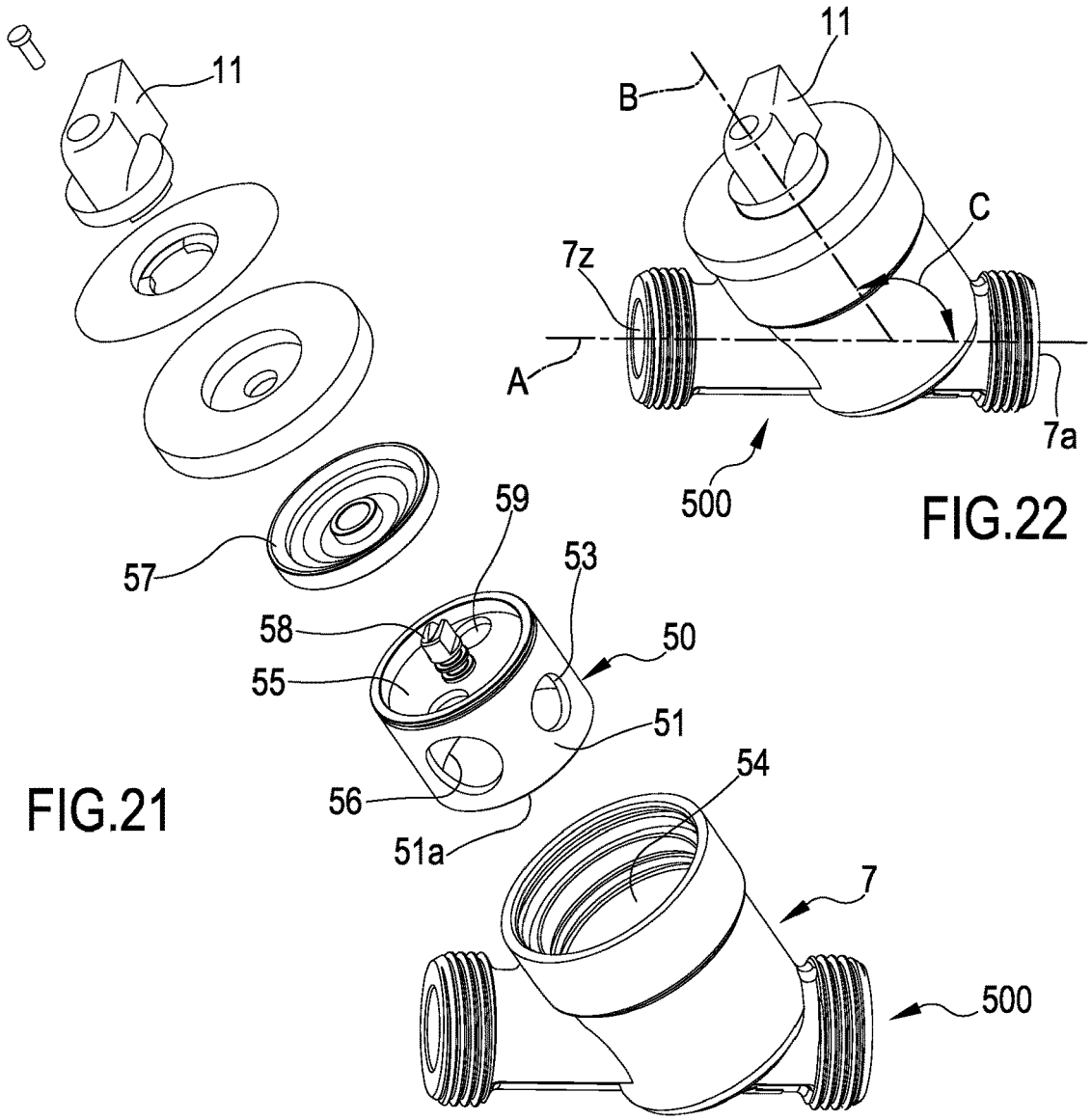
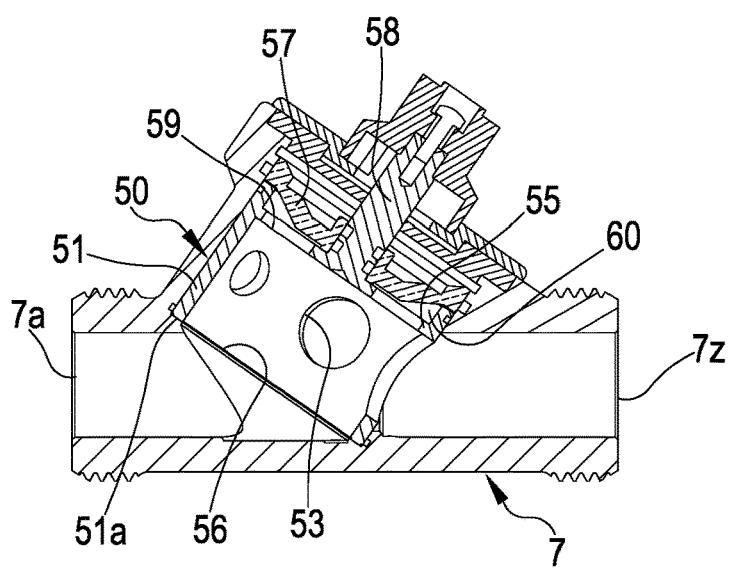
FIG.21  FIG.22  FIG.23

ASSEMBLY INSTALLABLE IN AN AIR CONDITIONING AND/OR HEATING SYSTEM, AIR CONDITIONING AND/OR HEATING SYSTEM COMPRISING THE ASSEMBLY AND METHOD OF CONTROLLING THE ASSEMBLY

RELATED APPLICATION

This application claims priority to Italian patent application 102016000129636 filed Dec. 21, 2016, and Italian patent application 102017000027730 filed Mar. 13, 2017, both of which are incorporated by reference.

FIELD OF THE INVENTION

The present invention relates to a method of controlling an assembly installable in a conduit of an air conditioning and/or heating system of a room, it refers to an assembly installable in a conduit of an air conditioning and/or heating system of a room and it refers to an air conditioning and/or heating system of a room.

BACKGROUND

The typical architecture of a heating and/or cooling system of a room requires the circulation of a process fluid (typically water) between a heating power and/or cooling power generator (such as a boiler or a refrigerant circuit) and a plurality of terminals (i.e. utilities such as radiators or fan coils). The process fluid moves through a closed circuit due to the prevalence imparted to the fluid by a pump. In particular, the fluid leaves the generator by means of a delivery line, thus transmitting the heating and/or cooling power with which to feed the terminals, and returns to the generator through a return line, once the heating and/or cooling power has been dissipated by the terminals. The delivery line and the return line are connected to a plurality of service lines, each of which includes one or more terminals. The service lines are equipped each with at least one regulating device (such as a valve) whose function is to control and/or interrupt the flow along the service line in which the regulator is installed.

The adjustment of a heating and/or conditioning system makes sure that each terminal is able to dissipate the heating and/or cooling power needed to achieve the desired environmental parameters (typically the temperature and/or humidity set by a user) where the terminal is installed. To ensure that these parameters are met, an adequately accurate control of the power exchanged by a terminal is needed. More in detail, exchanged power must be monitored and if the exchanged power does not allow achieving the desired environmental parameters, the adjustment device intervenes to increase or decrease the flow along the service line and therefore the heating and/or cooling power that can be dissipated by the terminal.

For the assessment of the heating and/or cooling power exchanged by a terminal with the room in which it is installed, measurement of the process fluid flow rate and of the process fluid temperature difference between the terminal delivery and the terminal return are necessary.

To measure flow rate of a fluid along a conduit and, particularly, to measure the flow rate of a fluid along a service line in a heating and/or cooling system of a room (upstream or downstream of a terminal), several technical solutions are known in the prior art which use different technologies.

According to the technical solutions that use ultrasound technology, the working principle of a flow meter is based on the difference of an ultrasonic pulse transit time through a fluid. This pulse, emitted by the meter, provides an output signal directly proportional to the speed of the liquid and thus to the instant flow rate. The technical solutions based on ultrasounds are appreciated for the accuracy of the measurements and for the amplitude of the range of detectable flow rates. However, they have the objective drawbacks of a high cost, excessive footprint and a more difficult integration in retrofits to existing heating and/or cooling systems.

According to the technical solutions that use the technology commonly referred to as "Vortex", the flow meter is based on the principle of vortex precession, theorized by Von Karman. When a fluid flows and meets a suitable generating fin, alternating vortices are formed, which detach from both sides with opposite direction of rotation. Pressure fluctuations due to the formation of vortices are detected by a sensor and converted into electrical pulses. The vortices are generated regularly within the limits of application of the meter. As a result, the generation frequency of the vortices is directly proportional to the flow rate. The technical solutions based on vortex precession are appreciated for the affordability and compactness of the meters. However, they have the objective drawbacks of a minimum detectable flow rate which is too high (of the order of 30 l/h). In addition, this type of detectors has unsatisfactory accuracy at flow rates below 25% of the measurable range. Therefore, the amplitude of the range of detectable flow rate values with vortex precession meters is greatly reduced.

Finally, according to the technical solutions that use a calibrated orifice (namely, a bottleneck which creates a narrow section where the flow is made to pass), the meter detects the pressure difference between the upstream and downstream of this narrow section. Suitable pressure pick-up lines are placed upstream and downstream of the narrow section, so that the pressure difference across the narrow section can be detected. The pressure differential, the geometric characteristics of the meter, and the knowledge of the fluid allow calculating the flow rate using an appropriate algorithm. The technical solutions based on the differential pressure are appreciated for the affordability and compactness of the meters. However, they have limited amplitude of the range of detectable flow rates which jeopardizes an effective use thereof in heating and/or cooling systems.

That being said, with particular reference to differential pressure meters (which can be used in a heating and/or cooling system, typically in conjunction with a calibrated orifice), the solutions known in the prior art have a number of significant problems.

A first criticality is related to the differential pressure values detectable by the meter. Generally, in fact, differential pressure meters, because of their working principle, are intrinsically characterized by a rather limited detection range, as previously mentioned. In addition to that, some known differential pressure meters have a too limited value of minimum detectable differential pressure.

A second criticality is related to the resolution of the known differential pressure meters. Also such criticality is particularly felt if the differential pressure meter is used for indirect measurements of a flow rate. In fact, in heating and/or cooling systems, in order to obtain fine adjustments of the systems (which allow consequent fine adjustments of the environmental parameters within the rooms served by the systems), it is very useful that the same are provided with the ability to finely vary the flow (for example through ball valves) and consequently with the ability to detect such fine variations.

A third criticality is related to the set up of the known differential pressure meters to be installed along conduits of heating and/or cooling systems. In this regard, in addition to the aspect related to the dimensions and the aspect related to the incidence of the meters on the overall system cost, there are additional critical aspects, related respectively to the poor attitude of the known differential pressure meters to be integrated in the intelligence of the management system that controls a heating and/or cooling system and to the lack of adequate ability to ensure, when installed, the necessary fluid-tightness, thus making the heating and/or cooling system susceptible of flow losses right at the points where the differential pressure meters are installed.

In the light of the drawbacks mentioned above as regards the prior art, in particular the prior art in the field of differential pressure meters, the present invention may be configured to implement a differential pressure meter having a wider range of detection and a rather low value of minimum detectable differential pressure. In this way, if the differential pressure meter is used for indirect measurements of a flow rate, it is capable of detecting low flow rates (significantly less than 30 l/h).

The invention may be configured to provide a differential pressure meter usable for fine adjustments of heating/cooling systems and therefore having a particularly high resolution and thus being able to provide accurate feedback signals based on which to perform the control of the flow regulators (e.g. ball valves).

The invention may be configured to implement a differential pressure meter that can be fully integrated in management systems of heating and/or cooling systems and fully interfaced with the electrical and/or electronic devices installed in such systems.

The invention may be configured to provide a differential pressure meter capable of ensuring, when installed along a conduit of a heating and/or cooling system, the necessary fluid-tightness, thus making the heating and/or cooling system virtually immune from flow losses at the point where the differential pressure meter is installed.

The invention may be configured to implement a differential pressure meter which allows indirectly obtaining a flow rate value and which is characterized by effective operation, stability of performance over time and ease of use.

The invention may be configured to implement a differential pressure meter particularly suitable to be used for a heating and/or cooling system, given its affordable cost, its small footprint and its aptitude to be integrated in complex control systems.

The invention may be configured to provide an assembly for measuring the flow rate of a fluid along a conduit and thus for adjusting such a flow rate accordingly (in particular for measuring the flow rate of a process fluid along a service line in a heating and/or cooling system of a room and for adjusting such a flow rate to bring the environmental parameters to the desired values) that is characterized by a wide range of detectable flow rate values.

The invention may be configured to provide an assembly which can be installed in a heating and/or cooling system for the measurement and adjustment of the flow rate that is easy to install due to its compactness and having a sustainable cost.

The invention may be configured to implement an assembly which can be installed in a heating and/or cooling system which allows a particularly accurate flow regulation, starting from a particularly accurate flow rate measurement.

The invention may be configured to implement an assembly which can be installed in a heating and/or cooling system that is adapted to be effectively integrated into a management system (such as an electronic control system) of such a system, so as to obtain important benefits in terms of system performance, speed of achieving the desired environmental conditions and energy saving.

The invention may be configured to define an operating method of an assembly which can be installed in a heating and/or cooling system which allows, through a particularly precise measurement of the flow rate, accurately controlling such a system and thus ensuring that the heating or cooling power supplied achieve the desired environmental conditions.

The invention may be embodied as a differential pressure meter (1) comprising: a main body (7) having at least one inlet opening (7a), at least one outlet opening (7z), at least one channel (70) which places the inlet opening (7a) in fluid communication with the outlet opening (7z), at least one housing (16) in turn defining an operating seat (160) therein separate from said channel (70) and having at least a first passage opening (16p) and at least a second passage opening (16s) configured for placing the operating seat (160) in fluid communication with said channel (70); a sealing casing (2) inserted in said operating seat (160) and in turn defining a respective inner volume (200); a sensitive element (3) accommodated in said casing (2) to divide the inner volume (200) of said casing (2) at least in a first chamber (4) and in a second chamber (5), a first surface (3d) of said sensitive element (3) being directed towards said first chamber (4), a second surface (3s) of said sensitive device (3) being directed towards said second chamber (5); a first pressure intake (4p) formed on said casing (2), said first passage opening (16p) being in communication with said first chamber (4) through said first intake (4p), said first intake (4p) being optionally aligned with said first passage opening (16p); and a second pressure intake (5p) formed on said casing (2), said second passage opening (16s) being in communication with said second chamber (5) through said second intake (5p), said second intake (5p) being optionally aligned with said second passage opening (16s).

A second aspect an embodiment of the invention, dependent on the first aspect, relates to a differential pressure meter (1), wherein said casing (2) defines a fluid seal along at least one dominant portion of a peripheral edge of the sensitive element (3) separating the first chamber (4) from the second chamber (5).

A third aspect of an embodiment of the invention, dependent on the first aspect or on the second aspect, relates to a differential pressure meter (1), wherein said sensitive element (3) comprises a sheet of electrically conductive material, optionally of metal, said sheet being configured in such a way that a pressure difference between said first chamber (4) and said second chamber (5) causes the deformation of said sheet.

A fourth aspect of an embodiment of the invention, dependent on any one of the preceding aspects, relates to a differential pressure meter (1), comprising a transducer connected to the sensitive element (3) and able to generate a signal, optionally electric, as a function of the deformation of said sensitive element (3).

A fifth aspect of an embodiment of the invention, dependent on any one of the preceding aspects, relates to a differential pressure meter (1), wherein at a rest condition in which the same pressure is present in said first chamber (4)

and in said second chamber (5), the sensitive element has a symmetrical conformation with respect to a plane of symmetry (P) crossing said inner volume (200) of the casing (2).

A sixth aspect of an embodiment of the invention, dependent on any one of the preceding aspects, relates to a differential pressure meter (1), wherein at said rest condition, said first chamber (4) and said second chamber (5) are mutually symmetrical according to said plane of symmetry (P), optionally wherein said first pressure intake (4p) and said second pressure intake (5p) are also mutually symmetrical with respect to said plane of symmetry (P).

A seventh aspect of an embodiment of the invention, dependent on any one of the preceding aspects, relates to a differential pressure meter (1), wherein said casing (2) is a fluid sealing body made in a single piece, for example made of a material comprising at least one of: elastomeric material or natural rubber or synthetic rubber.

An eighth aspect of an embodiment of the invention, dependent on any one of the preceding aspects, relates to a differential pressure meter (1), comprising a closing element (100) coupled to the main body (7) and active in closing of the operating seat (160) housing said casing (2) and said sensitive element (3).

A ninth aspect of an embodiment of the invention, dependent on any one of the preceding aspects, relates to a differential pressure meter (1), wherein in the sensitive element (3) is constrained to said closing element (100) and wherein the closing element is removably engaged to the main body (7) so that a detachment of the closing element (100) from the main body (7) causes an extraction of the sensitive element (3) and optionally of the sealing casing (2) from said operating seat (160).

A tenth aspect of an embodiment of the invention, dependent on any one of the preceding aspects, relates to a differential pressure meter (1), wherein the sealing casing (2) comprises: a first closed end (2a) facing towards a bottom of said operating seat (160), a second open end (2z) opposite the first end, and a tubular body (2f) extending axially between said first end (2a) and said second end (2z), said tubular body (2f) having said first pressure intake (4p) and said second pressure intake (5p).

an eleventh aspect of an embodiment of the invention, dependent on the tenth aspect, relates to a differential pressure meter (1), wherein the sealing casing (2) defines an annular sealing lip at said second end (2z).

A twelfth aspect of an embodiment of the invention, dependent on the tenth aspect or on the eleventh aspect, relates to a differential pressure meter (1), wherein the sealing casing (2) comprises a sealing projection extending on opposite sides of the tubular body (2f) and along the first end (2a), said projection extending at the peripheral edge of said sensitive element (3) and ensuring a fluid-tight separation between said first chamber (4) and said second chamber (5).

A thirteenth aspect of an embodiment of the invention, dependent on the twelfth aspect, relates to a differential pressure meter (1), wherein the sensitive element (3) comprises a flat polygonal sheet and wherein said sealing projection develops in plane along a plurality of the sides of the polygonal sheet, optionally wherein sealing projection develops along three of the four sides in case of flat rectangular sheet.

A fourteenth aspect of an embodiment of the invention, dependent on the thirteenth aspect, relates to a differential pressure meter (1), wherein the casing (2) comprises an expanded portion (2r) defined at or in the proximity of the first closed end (2a) of the sealing casing (2) itself and adapted to be inserted by interference in said operating seat (160), optionally wherein said expanded portion (2r) comprises a first protuberance (200p) and a second protuberance (200s) symmetrically opposite each other and intended to mate with a respective first cavity (160p) and a second cavity (160s) of said operating seat (160).

A fifteenth aspect of an embodiment of the invention, dependent on the fourteenth aspect, relates to a differential pressure meter (1) comprising a clip (17) inserted at least partially in said operating seat (160) through a slit (170) formed in said housing (16), wherein said expanded portion (2r) is inserted snap-wise in said operating seat (160) by means of said clip (17).

A sixteenth aspect of invention, dependent on any one of the preceding aspects, relates to a differential pressure meter (1), said differential pressure meter (1) comprising at least one calibrated orifice arranged in said channel, wherein the first passage opening and the second passage opening are arranged upstream and downstream of said calibrated orifice, respectively.

A seventeenth aspect of an embodiment of the invention, dependent on any one of the preceding aspects, relates to a differential pressure meter (1), comprising a temperature sensor operating in said operating seat (160) and intended to generate a further signal, optionally electric, function of the temperature of a fluid flowing through said channel (70).

An eighteenth aspect relates to an assembly installable in a conduit of an air conditioning and/or heating system of a room comprising the device according to any one of the preceding aspects.

A nineteenth aspect relates to an assembly installable in a conduit of an air conditioning and/or heating system of a room, comprising: a main body (7) having an inlet opening (7a), an outlet opening (7z) and at least one channel (70) which places the inlet opening (7a) in fluid communication with the outlet opening (7z); an orifice arranged in said body (7) and shaped in such a way that when a flow runs through said channel (70) between said inlet opening (7a) and said outlet opening (7z), a pressure difference is generated between a first region (7p) and a second region (7s) within said body (7), said first region (7p) being located upstream of said orifice, said second region (7s) being located downstream of said orifice; a measurement device or pressure meter suitable for detecting said pressure difference; a variator of at least one geometric characteristic of said orifice, said variator being able to arrange the orifice in a plurality of different configurations, each corresponding to a respective geometric characteristic of the orifice.

In a twentieth aspect according to the preceding aspect, the geometric characteristic of the orifice variable by means of said variator comprises one or more of: a linear dimension characteristic of said orifice, such as diameter of said orifice, an area characteristic of said orifice, such as an area of the fluid passage section through said orifice, and a profile of said orifice.

In a twenty-first aspect according to any one of the two preceding aspects, the assembly comprises a regulator (8) of a representative quantity, in particular of a flow rate, of said flow through said orifice.

In a twenty-second aspect according to any one of the three preceding aspects, said variator is configured for varying said at least one geometric characteristic of said orifice in a discrete manner among a plurality of predefined geometric characteristics.

In a twenty-third aspect according to any one of the 4 preceding aspects, the geometric characteristic is the area of the fluid passage section through said orifice; said variator being configured for varying the area of the fluid passage section through said orifice among a plurality of discrete values gradually increasing from a minimum value to a maximum value.

In a twenty-fourth aspect according to any one of the 5 preceding aspects, said variator further comprises a first selector element (10p), a second selector element (10s) and an actuator (11), wherein: said first selector element (10p) and said second selector element (10s) are disc-shaped and are mutually adjacent and substantially coaxial; said first selector element (10p) is mounted in said body (7) in a fixed angular position; said second selector element (10s) is coupled to said actuator (11), said actuator (11) being suitable for rotating said second selector element (10s) with respect to said first selector element (10p), an opening (12) is formed on one between said first selector element (10p) and said second selector element (10s), holes (13a,13b,13c, 13d,13e,13f) are formed on the other one between said first selector element (10p) and said second selector element (10s), the number of said holes (13a, 13b, 13c, 13d, 13e, 13f) in particular corresponding to the number of predefined values of said at least one geometric characteristic, and switching from a first to a second between said predefined values of said at least one geometric characteristic of said orifice being carried out by means of said actuator (11) by a rotation of said second selector element (10s) aimed at changing the relative angular position between said second selector element (10s) and said first selector element (10p) from a first relative angular position, in which said opening (12) is substantially aligned to first of said holes (13a, 13b, 13c, 13d, 13e, 13f) to a second relative angular position, in which said opening (12) is substantially aligned to a second of said holes (13a, 13b, 13c, 13d, 13e, 13f), said opening (12) being preferably formed on said first selector element (10p) and said holes (13a, 13b, 13c, 13d, 13e, 13f) being preferably formed on said second selector element (10s).

In a twenty-fifth aspect according to any one of the six preceding aspects, said body (7) comprises at least one housing (16) in turn defining an operating seat (160) therein separate from said channel (70) and having at least a first passage opening (16p) and at least a second passage opening (16s) configured for placing the operating seat (160) in fluid communication with said channel (70).

In a twenty-sixth aspect according to the preceding aspect, the meter device is the meter of any one of the aspects from the first to the eighteenth.

In a twenty-seventh aspect according to any one of the eight preceding aspects, the assembly comprises a control unit (9) operatively connected to said measurement device or pressure meter for receiving a signal related to said pressure difference, and operatively connected to said variator, for driving the variator and arranging the orifice in one of said different configurations.

In a twenty-eighth aspect according to the preceding aspect, said control unit (9) is configured for executing: a measurement procedure of a real value of a quantity representative of a flow through said orifice, in particular said quantity being for example the pressure differential (pressure drop) across the orifice or the flow rate through said channel (70).

In a twenty-ninth aspect according to one of the two preceding aspects, said control unit (9) is configured for executing: a correction procedure of the real value of said representative quantity, aimed to correct the real value of the representative quantity at least when the real value measured deviates more than a fixed limit from a desired value for the same representative quantity.

In a thirtieth aspect according to any one of the two preceding aspects, the measurement procedure of the real value of the quantity representative of the flow through said orifice comprises (in a first alternative) the following steps that the control unit (9) is configured to execute: receiving the desired value of the quantity representative of flow through said orifice; establishing whether said desired value falls within a reference range of the same representative quantity measurable with the orifice in said current configuration, said range being memorized; if it is established that said desired value is not within the reference range of the same quantity measurable with the orifice in said current configuration, driving the variator and arranging the orifice in a different configuration; if it is established that said desired value falls within the reference range of the same quantity measurable with the orifice in said current configuration, calculating a real value of the representative quantity as a function of the pressure difference acquired by said measurement device or pressure meter and as a function of the geometric characteristic of said orifice corresponding to said current configuration.

The control unit may be further configured in such a way that steps b) to c), optionally steps a) to c), of the measurement procedure of the real value of the representative quantity according to the first alternative are repeated iteratively, such an iteration ending when said desired value is within the reference range of the same quantity measurable with the orifice in said current configuration;

In a thirty-first aspect according to any one of the three preceding aspects, the measurement procedure of the real value of the quantity representative of the flow through said orifice comprises (in a second alternative which may be carried out alone in place of the first alternative) the following steps that the control unit (9) is configured for executing: calculating a real value of the representative quantity as a function of the pressure difference acquired by said measurement device or pressure meter and as a function of the geometric characteristic of said orifice corresponding to said current configuration; establishing whether said real calculated value falls within a reference range of the same representative quantity measurable with the orifice in said current configuration; if it is established that said calculated value is not within the reference range of the same quantity measurable with the orifice in said current configuration, driving the variator and arranging the orifice in a different configuration; if it is established that said calculated value is within the reference range of the same quantity measurable with the orifice in said current configuration, considering said real value calculated as a correct measurement of the real value of the quantity representative of the flow through said orifice.

The control unit may be further configured in such a way that steps a) to c) of the measurement procedure of the real value of the representative quantity according to the second alternative are repeated iteratively, such an iteration ending when said calculated real value is within the reference range of the same quantity measurable with the orifice in said current configuration.

In a thirty-second aspect according to any one of the two preceding aspects, the control unit is further configured for executing the step of establishing, among the plurality of said configurations, the current configuration of said orifice prior to said step of establishing whether said real value, or said desired value, fall within a reference range of the same representative quantity measurable with the orifice in said current configuration.

In a thirty-third aspect according to any one of the aspects xxix to xxxii, the correction procedure of the real value of said representative quantity comprises the steps of: comparing the calculated real value, obtained in said calculation step of a real value of the representative quantity, with a target value or with said desired value, and driving the regulator (8) for increasing or decreasing the real flow value if said error is, in absolute value, greater than a fixed threshold.

A thirty-fourth aspect relates to an air conditioning and/or heating system comprising: a heat power and/or cooling power generator, said generator in particular comprising a boiler (18); a delivery line (19) connected to the output of said generator; a return line (20) connected to the input of said generator; at least one service line (21) connected between said delivery line (19) and said return line (20); a circulation member suitable for circulating a fluid through said delivery line (19), said at least one service line (21) and said return line (20), said circulation member comprising in particular a pump (22); at least one user arranged in said at least one service line (21) and suitable for supplying heating power and/or cooling power in a room, said user comprising in particular a heat exchanger (23) and an assembly according to any one of the preceding aspects relating to the assembly.

The assembly may for example be installed in said service line (21) in such a way that said fluid, by circulating along said service line (21), crosses said first region (7p) first and then said second region (7s).

In a thirty-fifth aspect according to the preceding aspect, the assembly further comprises a control system (24) operatively connected to said control unit (9), wherein said control system (24) is configured for calculating the desired value or the target value of said quantity representative of said flow according to the heat and/or cooling power to be supplied in said room through said at least one user and for transmitting the incoming desired or target value to said control unit (9), said heating and/or cooling power to be supplied being automatically defined by said system and/or according to a selection operation made by a user of said system.

A thirty-sixth aspect relates to a control method of an assembly installable in a conduit of an air conditioning and/or heating system of a room.

In a thirty-seventh aspect, the method according to the preceding aspect controls an assembly according to any one of the preceding aspects relating to an assembly, in particular an assembly comprising: a body (7) having an inlet opening (7a), an outlet opening (7z) and at least one channel (70) which places the inlet opening (7a) in fluid communication with the outlet opening (7z); an orifice arranged in said body (7) and shaped in such a way that when a flow runs through said channel (70) between said inlet opening (7a) and said outlet opening (7z), a pressure difference is generated between a first region (7p) and a second region (7s) within said body (7), said first region (7p) being located upstream of said orifice, said second region (7s) being located downstream of said orifice; a measurement device or pressure meter (1) configured for detecting said pressure difference; and a variator of at least one geometric characteristic of said orifice, said variator being able to arrange the orifice in a plurality of different configurations, each corresponding to a respective geometric characteristic of said orifice.

A thirty-eighth according to any one of the two preceding aspects, said method comprises: a measurement procedure of a real value of a quantity representative of a flow through said orifice, in particular said quantity being the pressure differential (or drop) across the orifice or the flow rate passing through said channel (70), and a correction procedure of the real value of said representative quantity, aimed to correct the real value of the representative quantity at least when the real value measured deviates more than a fixed limit from a desired value for the same representative quantity.

In a thirty-ninth aspect according to the preceding aspect, the measurement procedure of the real value of the quantity representative of the flow through said orifice comprises, in a first alternative, the following steps: receiving the desired value of the quantity representative of flow through said orifice; establishing whether said desired value falls within a reference range of the same representative quantity measurable with the orifice in said current configuration; if it is established that said desired value is not within the reference range of the same quantity measurable with the orifice in said current configuration, acting on the variator and arranging the orifice in a different configuration; if it is established that said desired value falls within the reference range of the same quantity measurable with the orifice in said current configuration, calculating a real value of the representative quantity as a function of the pressure difference acquired by said measurement device or pressure meter and as a function of the geometric characteristic of said orifice corresponding to said current configuration.

Alternatively, the measurement procedure of the real value of the quantity representative of the flow through said orifice comprises, in a second alternative, the following steps: calculating a real value of the representative quantity as a function of the pressure difference acquired by said measurement device or pressure meter and as a function of the geometric characteristic of said orifice corresponding to said current configuration; establishing whether said real calculated value falls within a reference range of the same representative quantity measurable with the orifice in said current configuration; if it is established that said real calculated value is not within the reference range of the same quantity measurable with the orifice in said current configuration, acting on the variator and arranging the orifice in a different configuration; if it is established that said calculated value is within the reference range of the same quantity measurable with the orifice in said current configuration, considering said real value calculated as a correct measurement of the real value of the quantity representative of the flow through said orifice.

It should be noted that steps b) to c), optionally a) to c), of the measurement procedure of the real value of the representative quantity according to the first alternative may be repeated iteratively, such an iteration ending when said desired value is within the reference range of the same quantity measurable with the orifice in said current configuration.

Steps a) to c) of the measurement procedure of the real value of the representative quantity according to the second alternative may be repeated iteratively, such an iteration ending when said calculated real value is within the reference range of the same quantity measurable with the orifice in said current configuration.

According to further aspects, the method of any one of the preceding aspects of method further comprises the step of establishing, among the plurality of said configurations, the current configuration of said orifice prior to said step of establishing whether said real value, or said desired value, fall within a reference range of the same representative quantity measurable with the orifice in said current configuration.

According to further aspects, the method of any one of the preceding aspects of method, said assembly further comprises a regulator (8) configured for varying the real value of the quantity representative of said flow through said orifice, and wherein the correction procedure of the real value of said representative quantity comprises the steps of:

comparing the calculated real value, obtained in said calculation step of a real value of the representative quantity, with a target value for determining a possible error, said target value optionally matching said desired value, and by acting on the regulator (8), increasing or decreasing the real flow value if said error is, in absolute value, greater than a fixed threshold.

42) According to a 42nd aspect, the variator used in the assembly or in the method of any one of the preceding aspects comprises a rotary selector (50) rotatably mounted in said body (7) and acting between the inlet opening (7a) and the outlet opening (7z) so as to intercept the fluid passing through the channel (70).

In particular, the rotary selector (50) comprises: a lateral wall (51) having an outer cylindrical shape, and an inner cavity (52) radially delimited by the lateral wall and facing towards said channel (70).

In a 43rd aspect according to the preceding aspect: the lateral wall (51) has through holes (53) passing through the thickness of the lateral wall itself, the rotary selector (50) is mounted in said body so as to assume a plurality of angular positions with respect to said body (7) so that, in each of said angular positions, a respective one of said through holes allows putting the inlet opening (7a) in flow communication with the outlet opening (7z).

In a 44th aspect according to the preceding aspect, the through holes (53) comprise a plurality of holes having a net passage section that is differentiated from one another, in particular increasing progressively from the smallest to the largest hole progressing around the lateral wall.

In a 45th aspect according to one of the two preceding aspects, the number of said through holes (53) corresponds to the number of predetermined values of said at least one geometric characteristic.

In a 46th aspect according to any one of the three preceding aspects, an actuator (11), optionally comprising an electric motor or a manual actuation knob, is active on said rotary selector (50) and configured to determine a rotation of said rotary selector by changing the relative angular position between said lateral wall (51) and the body (7) from a first angular position, in which a first one of said holes (53) puts said inner cavity (52) in fluid communication with one between said inlet opening (7a) and said outlet opening (7z), to a second angular position, in which a second one between said holes (53) puts said inner cavity (52) in fluid communication with one between said inlet opening (7a) and said outlet opening (7z), and wherein the rotation of said selector which changes the relative angular position between said lateral wall (51) and the body (7) from the first to the second angular position causes a corresponding switching from a first to a second one between said predetermined values of said at least one geometric characteristic of said orifice.

In a 47th aspect according to any one of the four preceding aspects, said rotary selector comprises: an end wall (55) placed transversely to one end of the lateral wall (51), and a main opening (56) axially opposite to the end wall (55) and delimited by a terminal edge (51a) of said lateral wall (51), said main opening (56) facing towards said inlet opening (7a) of the channel (7) and allowing fluid passing from the inlet opening (7a) towards the outlet opening (7z) to access to the inner cavity (52) and, subsequently, cross at least one of said through holes (53).

48). In a 48th aspect according to any one of the five preceding aspects, said inlet opening (7a) and said outlet opening (7z) are arranged substantially coaxially with respect to an ideal axis (A) passing through the same inlet and outlet openings and wherein said lateral wall (51) is inserted in a seat (54) formed in the body (7) and extending according to a respective development axis (B) that is inclined with respect to said ideal axis (A).

In a 49th aspect according to the preceding aspect, the rotary selector (50) is rotatably mounted in said seat (54) defined in the body (7), and wherein the terminal edge delimiting the main opening (56) cooperates with an annular abutment defined at the inner wall of the channel (7) so that said main opening extends substantially entirely through the passage gap of the channel (7) and in such a way that at least one of said holes can be positioned in a position substantially aligned with said inlet opening (54) and with said main opening (56).

In a 50th aspect according to any one of the three preceding aspects, a sealing member (57) is associated at said end wall (55), and wherein a driving axis (58) angularly integral with the end wall (55) passes through said sealing member (57) and is mechanically connected to said actuator (11) to allow an angular rotation of the selector by said actuator.

In a 51st aspect according to the preceding aspect, said sealing member comprises a disc-like cap sealably engaged with one end of said seat (54), and wherein said end wall (55) has at least one passage hole (58) for putting a pressure relief chamber (59), defined between the end wall (55) and the sealing member (57), in fluid communication with the inner cavity (52) of the lateral wall (51).

In a 52nd aspect according to any one of the ten preceding aspects, the rotary selector can be positioned in a plurality of predetermined angular opening positions, at each of which a respective one of said through holes (53) puts the inner chamber in fluid communication with the outlet opening (7z), and in at least one closed position, in which said lateral wall (51) inhibits the passage of fluid between said inlet opening (7a) and said outlet opening (72).

A 53rd aspect relates to a valve, in particular for controlling the flow in a fluid distribution system, for example for air conditioning and/or heating systems, comprising: a main body (7) having at least one inlet opening (7a), at least one outlet opening (7z) and at least one channel (70) which places the inlet opening (7a) in fluid communication with the outlet opening (7z), a rotary selector (50) rotatably mounted in said body (7) and acting between the inlet opening (7a) and the outlet opening (7z) so as to intercept (by inhibiting or passing in a controlled manner) the fluid passing through the channel (70), wherein the rotary selector (50) comprises: a lateral wall (51) having an outer cylindrical shape, and an inner cavity (52) radially delimited by the lateral wall and facing towards said channel (70); and wherein: the lateral wall (51) has through holes (53) passing through the thickness of the lateral wall itself, the rotary selector (50) is mounted in said body so as to assume a plurality of angular positions with respect to said body (7) so that, in each of said angular positions, a respective one of said through holes allows putting the inlet opening (7a) in flow communication with the outlet opening (7z).

In a 54th aspect according to the preceding aspect, the through holes (53) comprise a plurality of holes having a net passage section that is differentiated from one another, in particular increasing progressively from the smallest to the largest hole progressing around the lateral wall.

In a 55th aspect according to one of the two preceding aspects, the number of said through holes (53) corresponds to the number of predetermined values of said at least one geometric feature.

In a 56th aspect according to any one of the three preceding aspects, an actuator (11), optionally comprising an electric motor or a manual actuation knob, is active on said rotary selector (50) and configured to determine a rotation of said rotary selector by changing the relative angular position between said lateral wall (51) and the body (7) from a first angular position, in which a first one of said holes (53) puts said inner cavity (52) in fluid communication with one between said inlet opening (7a) and said outlet opening (7z), to a second angular position, in which a second one between said holes (53) puts said inner cavity (52) in fluid communication with one between said inlet opening (7a) and said outlet opening (7z), and wherein the rotation of said selector which changes the relative angular position between said lateral wall (51) and the body (7) from the first to the second angular position causes a corresponding switching from a first to a second one between said predetermined values of said at least one geometric feature of said orifice.

In a 57th aspect according to any one of the four preceding aspects, said rotary selector comprises: an end wall (55) placed transversely to one end of the lateral wall (51), and a main opening (56) axially opposite to the end wall (55) and delimited by a terminal edge (51a) of said lateral wall (51), said main opening (56) facing towards said inlet opening (7a) of the channel (7) and allowing fluid passing from the inlet opening (7a) towards the outlet opening (7z) to access to the inner cavity (52) and, subsequently, cross at least one of said through holes (53).

58). In a 58th aspect according to any one of the five preceding aspects, said inlet opening (7a) and said outlet opening (7z) are arranged substantially coaxially with respect to an ideal axis (A) passing through the same inlet and outlet openings and wherein said lateral wall (51) is inserted in a seat (54) formed in the body (7) and extending according to a respective development axis (B) that is inclined with respect to said ideal axis (A).

In a 59th aspect according to the preceding aspect, the rotary selector (50) is rotatably mounted in said seat (54) defined in the body (7), and wherein the terminal edge delimiting the main opening (56) cooperates with an annular abutment defined at the inner wall of the channel (7) so that said main opening extends substantially entirely through the passage gap of the channel (7) and in such a way that at least one of said holes can be positioned in a position substantially aligned with said inlet opening (54) and with said main opening (56).

In a 60th aspect according to any one of the three preceding aspects, a sealing member (57) is associated at said end wall (55), and wherein a driving axis (58) angularly integral with the end wall (55) passes through said sealing member (57) and is mechanically connected to said actuator (11) to allow an angular rotation of the selector by said actuator.

In a 61st aspect according to the preceding aspect, said sealing member comprises a disc-like cap sealably engaged with one end of said seat (54), and wherein said end wall (55) has at least one passage hole (59) for putting a pressure relief chamber (60), defined between the end wall (55) and the sealing member (57), in fluid communication with the inner cavity (52) of the lateral wall (51).

In a 62nd aspect according to any one of the ten preceding aspects, the rotary selector can be positioned in a plurality of predetermined angular opening positions, at each of which a respective one of said through holes (53) puts the inner chamber in fluid communication with the outlet opening (7z), and in at least one closed position, in which said lateral wall (51) inhibits the passage of fluid between said inlet opening (7a) and said outlet opening (72).

SUMMARY OF THE DRAWINGS

All aspects listed herein, along with further aspects of the invention, are further described in detail in the following description relating to at least one non-limiting embodiment of the invention. This description refers to the accompanying figures, also provided only for illustrative and, therefore, non-limiting purposes, in which:

FIG. 1 to FIG. 5 show a sub-assembly comprising a meter according to the present invention and being suitable for implementing the method according to the present invention;

FIG. 17 and FIG. 18 show, in exploded and assembled condition view, respectively, a sub-assembly for detecting the differential pressure across an orifice;

FIG. 19 and FIG. 20 show, in exploded and assembled condition view, respectively, an assembly;

FIG. 21 and FIG. 22 show, in exploded and assembled condition view, respectively, a valve; and FIG. 23 shows a longitudinal section of the valve of FIG. 21; 22.

DETAILED DESCRIPTION OF EMBODIMENT(S) OF THE INVENTION

Figure 1:
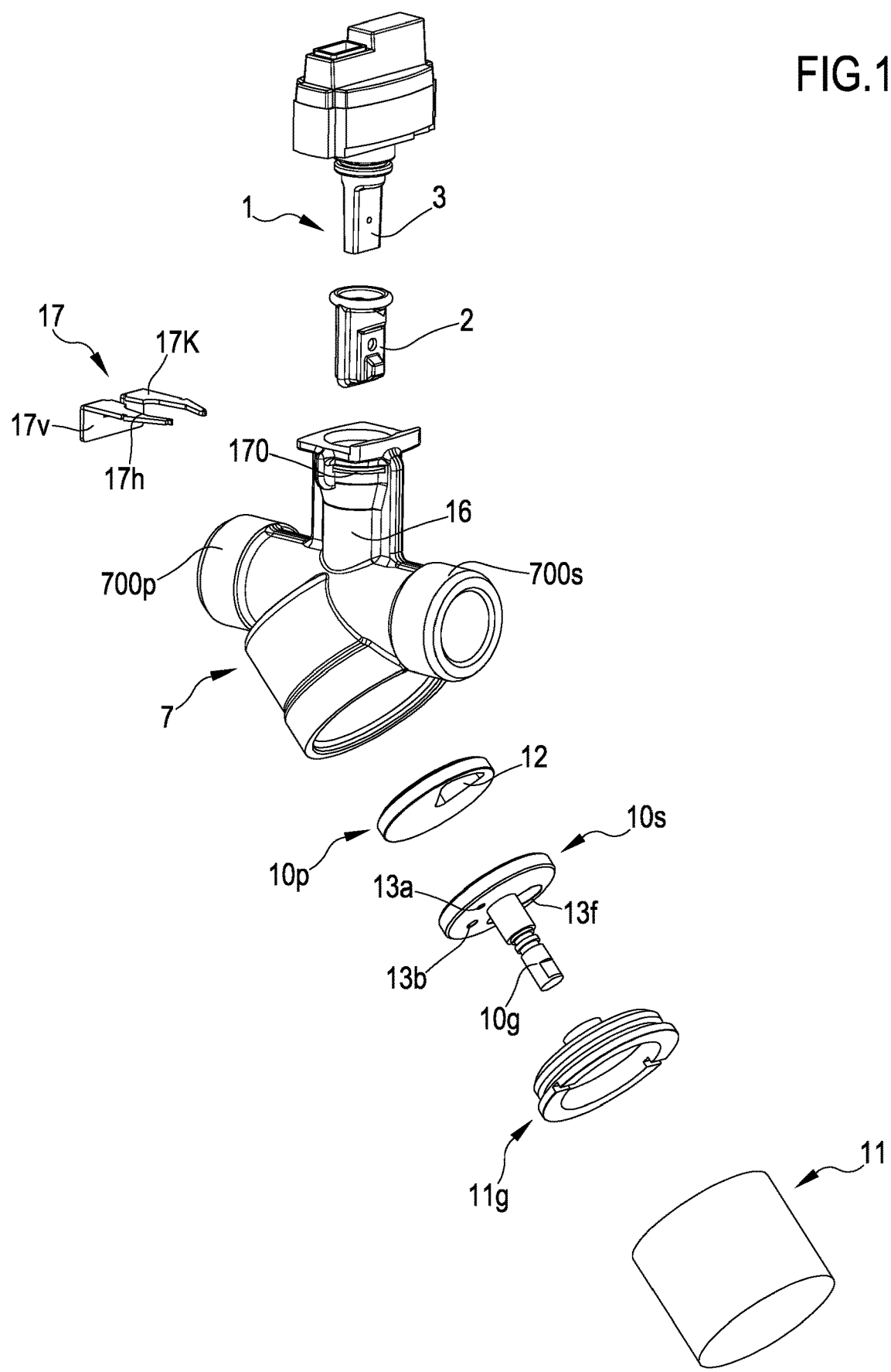
Figure 12:
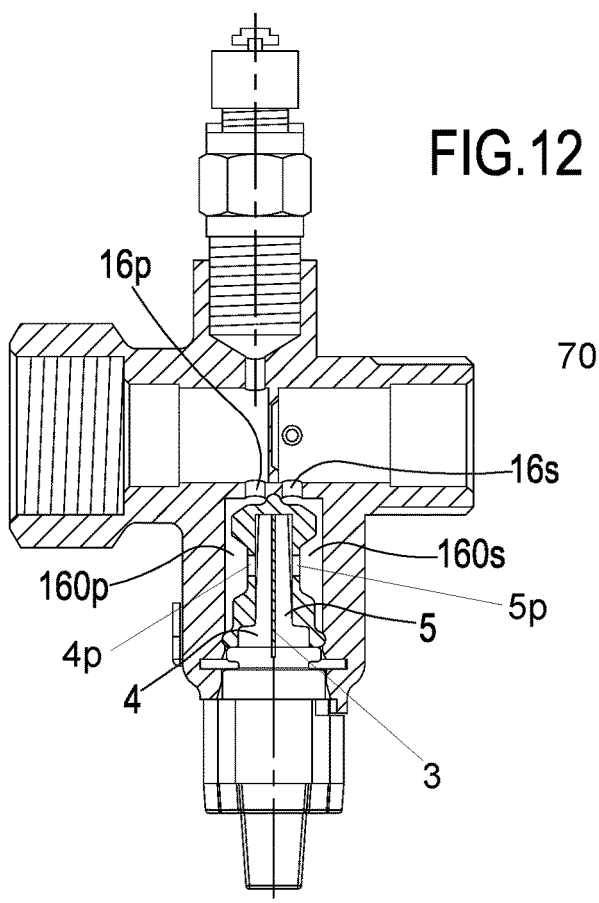
FIG. 12 is a sectional view of a meter.

FIG. 1 shows an exploded view of a sub-assembly according to the present invention. This sub-assembly is advantageously arranged to be installed in a conduit of a heating and/or air conditioning system and, as will be illustrated in detail, its primary function is the accurate detection of at least one quantity (preferably the flow rate) representative of the flow that crosses the conduit to which the sub-assembly is applied. The sub-assembly shown in FIG. 1 is further shown in the isometric views in FIG. 2 and FIG. 3 and in the sectional views in FIG. 4, FIG. 5 and FIG. 12.

The sub-assembly has a body 7 acting as a main structural element and which allows the coupling of the sub-assembly within a conduit, such as a conduit of a heating and/or conditioning system. For the connection with the structural elements of such a conduit (typically pipes) respectively arranged immediately upstream and immediately downstream with respect to the sub-assembly, body 7 comprises a first assembly sleeve 700p and a second assembly sleeve 700s. The sleeves include for example threaded connections.

Body 7 is suitable for being crossed by a fluid flow: by way of non-limiting example, fluid flow may cross body 7 in the direction going from the first sleeve 700p to the second sleeve 700s (thus from the left to right in FIG. 1). To this end, body 7 has an inlet opening 7a, an outlet opening 7z and at least one channel 70 which places the inlet opening 7a in fluid communication with the outlet opening 7z. While in the figures, the inlet opening 7a and the outlet opening 7z are shown mutually aligned, the present invention is not limited to this arrangement.

An orifice is then arranged in body 7 and is configured and specifically shaped in such a way that when a flow runs through channel 70 between the inlet opening 7a and the outlet opening 7z, a pressure difference is generated between a first region 7p and a second region 7s within body 7, the first region 7p being located upstream of the orifice, the second region 7s being located downstream of the orifice. This pressure difference is then detected by a meter device applied to the sub-assembly and allows obtaining the quantity representative of the flow (in reality the pressure drop and the flow rate may be quantities representative of the flow through the orifice and therefore through the channel).

The pressure drop across the orifice is related to the flow rate that passes through channel 70 through a numerical coefficient, which depends on several factors comprising: the shape and/or the size and/or the surface finish of the orifice. Therefore, the action exerted by the orifice on the flow may conveniently be summarized by at least one geometric characteristic of the orifice, which may be, for example, a characteristic linear dimension of the orifice, such as a diameter of the orifice (a larger diameter causing a lower pressure drop compared to a smaller diameter), a characteristic area of the orifice, such as an area of the fluid passage section through the orifice (a larger area causing a lower pressure drop than a smaller area) or an orifice shape (a shape with a larger area/perimeter ratio causing a lower pressure drop than a shape with a smaller area/perimeter ratio).

The sub-assembly according to the present invention comprises a variator of at least one geometric characteristic of the orifice, with the function of arranging the orifice in a plurality of different configurations, each corresponding to a respective geometric characteristic of the orifice. The variator is thus able to vary at least one between a characteristic linear dimension of the orifice, a characteristic area of the orifice and a shape of the orifice. The use of the variator inside the sub-assembly (in combination with a differential pressure meter) allows in fact to overcome the problem of the too limited amplitude of the measurement range typical of the prior art, without detriment for the accuracy in the measures.

The variator may be configured for varying the at least one geometric characteristic of the orifice in a discrete manner among a plurality of predefined values of the geometric characteristic. Alternatively, the variator may be suitable for varying the at least one geometric characteristic of the orifice continuously within a range of predefined geometric characteristics; the range may be defined by a first predefined geometric characteristic taken as the lower limit of the range and a second predefined geometric characteristic taken as the upper limit of the same range.

In the non-limiting example shown in FIG. 1, the variator is able to vary the geometric characteristic of the orifice in a discrete manner, in particular among six different predefined geometric characteristic values, each of which is expressed by means of a calibrated hole 13a, 13b, 13c, 13d, 13e, 13f being part of the variator.

Advantageously, the variator comprises a first selector element 10p, a second selector element 10s and an actuator 11. A variation in the relative arrangement between the first selector element 10p and the second selector element 10s by means of actuator 11 determines a variation in the calibrated hole 13a, 13b, 13c, 13d, 13e, 13f that can be crossed by the flow and therefore a variation of the geometric characteristic of the orifice.

According to the embodiment of the invention shown in FIG. 1, both the first element selector 10p and the second selector element 10s are disc-shaped. The mutual arrangement between the selector elements 10p, 10s is such that they are mutually adjacent and substantially coaxial. The first selector element 10p is mounted inside body 7 in a fixed position in which it is capable of intercepting the flow that crosses channel 70. For example, the first selector element 10p is installed so that its angular position remains fixed. The second selector element 10s, mounted inside the body 7 adjacent the first selector element 10p so as to be also capable of intercepting the flow that runs through channel 70, is instead installed so that a variation of the position of the same within body 7 is possible: for example the second selector element is mounted such that it is possible to vary its angular position relative to body 7. To this end, in accordance with the non-limiting example shown in the figures, the second selector element 10s has, in addition to a disc element, also a shaft 10g which axially protrudes from the disc element and which optionally forms a single piece with the disc element. This shaft 10g is coupled with an assembly ring 11g integral with actuator 11. The coupling between the second selector element 10s and the actuator 11 is thus completed, due to which actuator 11 (typically an electric motor) causes rotation of the second selector element 10s and therefore the variation in the relative angular position of the second selector element 10s with respect to the first selector element 10p.

On one of the first selector element 10p and the second selector element 10s there is formed an opening 12, while on the other between the first selector element 10p and the second selector element 10s there are formed holes 13a, 13b, 13c, 13d, 13e, 13f. In the example of sub-assembly in FIG. 1, the opening 12 is formed on the first selector element 10p, while the holes 13a, 13b, 13c, 13d, 13e, 13f are formed on the second selector element 10s (shown in front view) in the detail in FIG. 13), this without excluding a complementary embodiment of the present invention in which holes 13a, 13b, 13c, 13d, 13e, 13f are formed on the first selector element 10p, while the opening 12 being in this case formed on the second selector element 10s.

Given the architecture of the variator described above, the actuator 11 is able to perform the switching from a first predefined value of at least one geometric characteristic of the orifice to a second predefined value of the at least one geometric characteristic of the orifice, rotating the second selector element 10s in order to modify its relative angular position with respect to the first selector element 10p. Following this rotation, the angular position of the second selector element 10s varies from a first relative angular position in which the opening 12 is substantially aligned with a first one between the holes 13a, 13b, 13c, 13d, 13e, 13f, to a second relative angular position in which the opening 12 is substantially aligned with a second one among said holes 13a, 13b, 13c, 13d, 13e, 13f. Since holes 13a, 13b, 13c, 13d, 13e, 13f correspond each to a predefined value of the geometric characteristic of the orifice (advantageously the holes 13a, 13b, 13c, 13d, 13e, 13f are in fact all different from each other), a rotation of the second selector element 10s sufficiently large to vary the hole 13a, 13b, 13c, 13d, 13e, 13f aligned with the opening 12 causes a variation in the value taken by the geometric characteristic of the orifice.

The opening 12 may have an own geometric characteristic value greater than the highest of the geometric characteristic values of the holes 13a, 13b, 13c, 13d, 13e, while hole 13f may have the same or higher characteristic value compared to that of opening 12. In this way:

the first predetermined value of the geometric characteristic of the orifice is determined by the geometrical characteristic of the first hole 13a, being the same aligned with the opening 12;

the second predetermined value of the geometric characteristic of the orifice is determined by the geometric characteristic of the second hole 13b, being the same aligned with the opening 12;

the third predetermined value of the geometric characteristic of the orifice is determined by the geometric characteristic of the third hole 13c, being the same aligned with the opening 12;

the fourth predetermined value of the geometric characteristic of the orifice is determined by the geometric characteristic of the fourth hole 13d, being the same aligned with the opening 12;

the fifth predetermined value of the geometric characteristic of the orifice is determined by the geometric characteristic of the fifth hole 13e, being the same aligned with the opening 12, and the sixth predetermined value of the geometric characteristic of the orifice is determined by the geometric characteristic of the sixth hole or of the opening 12, being the same aligned to the sixth hole 13f.

Alternatively, the opening 12 may have a value of its own geometric characteristic greater than the geometric characteristic of all holes 13a, 13b, 13c, 13d, 13e, 13f. In this way:

the first predetermined value of the geometric characteristic of the orifice is determined by the geometrical characteristic of the first hole 13a, being the same aligned with the opening 12;

the second predetermined value of the geometric characteristic of the orifice is determined by the geometric characteristic of the second hole 13b, being the same aligned with the opening 12;

the third predetermined value of the geometric characteristic of the orifice is determined by the geometric characteristic of the third hole 13c, being the same aligned with the opening 12;

the fourth predetermined value of the geometric characteristic of the orifice is determined by the geometric characteristic of the fourth hole 13d, being the same aligned with the opening 12;

the fifth predetermined value of the geometric characteristic of the orifice is determined by the geometric characteristic of the fifth hole 13e, being the same aligned with the opening 12, and the sixth predetermined value of the geometric characteristic of the orifice is determined by the geometrical characteristic of the sixth hole 13f, being the same aligned with the opening 12.

If on the one hand, the number of holes 13a, 13b, 13c, 13d, 13e, 13f determines the number of available values of the at least one geometric characteristic, on the other hand their arrangement on the second selector element 10s affects the comfort of use and the control simplicity of the variator. Advantageously, the holes 13a, 13b, 13c, 13d, 13e, 13f are in a sequence on the surface of the second selector element 10s so that the at least one geometric characteristic of the orifice associated with each of said holes 13a, 13b, 13c, 13d, 13e, 13f is gradually increasing (or gradually decreasing). Therefore, considering as a reference hole 13a the hole whose geometrical characteristic is taken as the lower limit of an adjustment range and considering as relative angular position of reference the angular position of the second selector element 10s with respect to the first selector element 10p in which opening 12 is substantially aligned with the reference hole 13a, the rotation of the second selector element 10s necessary (starting from the reference angular position) to align opening 12 with any other one of said holes 13a, 13b, 13c, 13d, 13e, 13f increases as the difference between the geometrical characteristic of the holes 13a, 13b, 13c, 13d, 13e, 13f and the geometric characteristic of said reference hole 13a increases. It should be noted that the position of the holes may have a different distribution with respect to that described: obviously, a regular distribution of the holes facilitates the design of a relative control system. However, nothing prevents distributing the holes 13a-13f in a disordered, and yet known, manner and controlling the selection of each hole or sub-groups of said holes with a suitable actuator capable of automatically managing a selector member and thus aligning opening 12 with one or more holes.

The embodiment of the variator shown in the example in FIG. 1 represents only one of the possible embodiments of a variator which can be used within the scope of the present invention and capable of varying the geometric characteristic of the orifice in a discrete manner. Other examples of a variator including a rotary disk are described in documents DE 2414713A1 and U.S. Pat. No. 6,053,055. Potentially applicable to this invention are also devices designed primarily for use as valves, for example the device shown in FIG. 3 of document EP1458277B2, or the device shown in FIG. 3 of document EP2052664B1, or the device shown in FIG. 4 of document EP2583614A2. Equally usable within the scope of the present invention is the device of document U.S. Pat. No. 4,098,296 which describes a variator comprising a plate in which a hole and a bar sliding with respect to said plate are obtained, so as to be arranged in four distinct positions, each of which corresponds to a certain occlusion degree of the hole.

In the alternative according to which the variator is suitable for varying the at least one geometric characteristic of the orifice continuously within a range of predefined geometric characteristics, the variator may comprise a shut-off member such as for example a diaphragm shutter, or a movable gate or a characterized passage; the shut-off member would be acting on a communication opening with a circular section or with a polygonal section or with a lobed section. Advantageously, the shut-off member acts on a communication opening having a section such as to initially allow a fine variation of the geometric characteristic of the orifice (an initial displacement of the shut-off member causes a slight variation of the geometric characteristic of the orifice), and subsequently a more abrupt adjustment of the geometric characteristic of the orifice (a final displacement of the shut-off member, even if of the same extent as the initial displacement, causing a significant variation of the geometric characteristic of the orifice).

For example, the shut-off member may be in the form of a rotary element which acts in combination with a slit formed on a fixed disk; the disk slit is partially closed by the rotary element so that the passage gap available to the flow is continuously increased or reduced. Other non-exhaustive examples of devices which use a diaphragm shut-off device, but which are also suitable for providing a continuous variation of the geometric characteristic of the orifice (thus being conveniently usable in the context of the present invention) are described in documents WO97/28390A1, EP1834116A1 and U.S. Pat. No. 2,402,585.

Compared to devices that provide a discrete variation of the geometric characteristic of the orifice, those which instead provide a continuous variation of the geometric characteristic of the orifice have the undoubted advantage of being able to optimize the geometric characteristic of the orifice according to the characteristics of the flow (in detail, of the flow rate) that passes through the orifice, thereby making the sub-assembly potentially even more adapted to ensure a particularly precise detection of the quantity representative of the flow through the orifice. On the other hand, they have superior complexity in the control, since it is necessary to know with sufficient accuracy the position of the shut-off device with respect to the communication opening on which said shut-off device acts, in order to have an equally accurate determination of the geometric characteristic of the orifice and, at the end, an equally accurate detection of the value of quantity representative of the flow through the orifice. In order to accurately detect the position of the shut-off device, the latter may be associated with a detector of the degree of opening of the communication opening. The output signal, optionally electric, from the detector of the degree of opening of the communication opening may be used as a feedback signal for the actuator controlling the shut-off member. In this way, it is possible to correct the position of the shut-off member if the degree of opening of the communication opening does not correspond to (or stay within a certain tolerance around) the desired degree of opening.

In conclusion, the devices which provide a continuous variation of the geometric characteristic of the orifice are preferred for their ability to continuously cover a wide range of the measured characteristic quantity, while the devices which provide a discrete variation of the geometric characteristic of the orifice are preferred as they allow obtaining perfectly repeatable geometric characteristics of the orifice with simplicity of control.

The sub-assembly may comprise a differential pressure meter 1. To this end, body 7 comprises at least one housing 16 in turn defining an operating seat 160 therein separate from channel 70 and having at least a first passage opening 16p and at least a second passage opening 16s configured for placing the operating seat 160 in fluid communication with channel 70. The first passage opening 16p and the second passage opening 16s are configured as channels (of a particularly reduced cross-section with respect to the section of channel 70) which branch off from channel 70 respectively upstream and downstream of the orifice. The first passage opening 16p and the second passage opening 16s have a direction transvers to and for example substantially orthogonal to the direction of channel 70. This allows to transmit the pressure of fluid flowing through channel 70 but protects the first passage opening 16p in the second passage opening 16s from significant penetration of the fluid running through channel 70 which would negatively affect the accuracy of differential pressure measurements.

Figure 10:
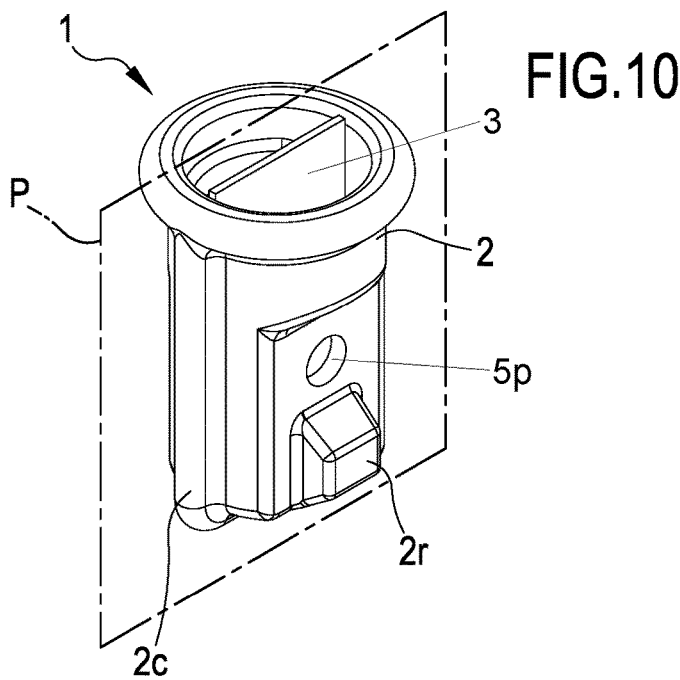
FIG. 10 and FIG. 11 are detailed views of peculiar elements of a meter.
Figure 11:
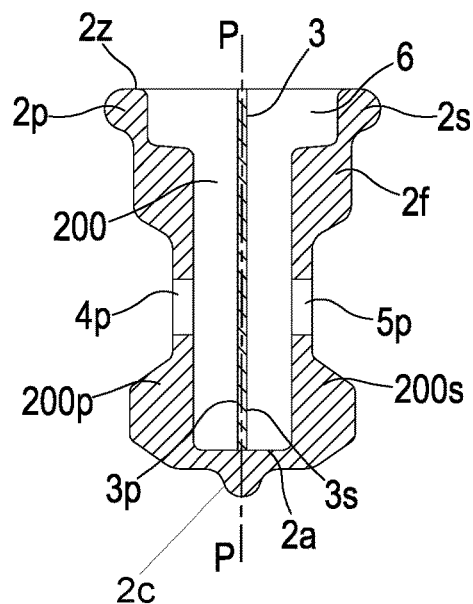

The differential pressure meter 1 according to the present invention is illustrated in the detailed views in FIG. 10 and FIG. 11. The meter comprises a sealing casing 2 inserted into the operating seat 160. The casing 2 is internally hollow and defines a respective inner volume 200. Casing 2 is a fluid sealing body made in a single piece, for example entirely made in or comprising a material such as elastomeric material or natural rubber or synthetic rubber. The elastic and/or flexible material of which casing 2 is made, optionally supported by the fact that such a casing 2 is a monobloc component, in fact ensures an adequate fluid seal along certain seal lines, when casing 2 is housed in the operating seat 160.

The sealing casing 2 comprises a first end 2a facing towards the bottom of the operating seat 160, a second end 2z opposed to the first end 2a and a tubular body 2f which extends substantially axially between the first end 2a and the second end 2z. For example, the first end 2a is a closed end, whereas the second end 2z is an open end. An opening 6 for accessing the inner volume 200 is in fact obtained in the second end 2z.

In the inner volume 200 of casing 2, a sensitive element 3 is housed, whereby the inner volume 200 is divided into a plurality of chambers, typically in a first chamber 4 and in a second chamber 5. The first and second chambers do not directly communicate (in the sense that fluid needs to exit from operating seat 160 for the first and second chambers to communicate) as the sensitive element 3 is fluid tightly engaged along its perimeter by the casing 2, which therefore separates the first and second chamber. As visible for example in FIG. 12 the housing of casing 2 in the operating seat 160 also forms a first cavity 160p and a second cavity 160s in the operating seat 160: the fluid tightness provided by casing 2 is ensured both between the first chamber 4 and the second chamber 5, and between the first cavity 160p and the second cavity 160s, which can only communicate fluid via passage openings 16p and 16s. The sensitive element 3 is installed in the inner volume 200 so that a first surface 3p of the sensitive element 3 faces the first chamber 4 and a second surface 3s of the sensitive element 3 is instead directed towards the second chamber 5. On the casing 2 are then formed both a first pressure intake 4p, and a second pressure intake 5p: the first chamber 4, through the first intake 4p, communicates with the first cavity 160p and thus with the first passage opening 16p, while the second chamber 5, through the second intake 5p, communicates with the second cavity 160s and thus with the second passage opening 16s. Both the first intake 4p and the second intake 5p are formed on the tubular body 2f. The first passage opening 16p and the first intake 4p are mutually arranged in such a way as to allow an easy communication of fluid between them. For example, the first passage opening 16p and the first intake 4p may be arranged perpendicular to each other (as shown for example in FIG. 12) or (in a variant not shown) they may be arranged aligned with each other. A similar mutual arrangement can also be provided between the second passage opening 16s and the second intake 5p.

The sensitive element 3 comprises a flat polygonal sheet of electrically conductive material, optionally made of metal, configured in such a way that a pressure difference between the first chamber 4 and the second chamber 5 causes the deformation of the sheet. Since the first chamber 4 is in communication with the first passage opening 16p, the latter being arranged on the body 7 upstream of the orifice, while the second chamber 5 is in communication with the second passage opening 16s, the latter being arranged on the body 7 downstream of the orifice, typically, in the presence of a flow through channel 70, the pressure in the first chamber 4 exceeds the pressure in the second chamber 5. Therefore, the sheet tends to inflect so that the pressure difference is compensated by increasing the volume of the first chamber 4 to the detriment of the volume of the second chamber 5.

In a rest condition, where the same pressure is present in the first chamber 4 and in the second chamber 5, the sensitive element 3 has a symmetrical shape with respect to a plane of symmetry P which passes through the inner volume 200 of casing 2. The first chamber 4 and the second chamber 5, in the rest condition of the pressure differential meter 1, are symmetrical to each other according to the plane of symmetry P. Optionally, in the rest condition of the pressure differential meter 1, also the first pressure intake 4p and the second pressure intake 5p are symmetrical to each other with respect to the plane of symmetry P. Instead, in a working condition, where on the first surface 3p of the sensitive element 3 facing the first chamber 4, there is a pressure different from the pressure on the second surface 3s facing the second chamber 5, there is a relative deformation of the first surface 3p with respect to the second surface 3s. The pressure differential meter 1 comprises a transducer connected to the sensitive element 3. This transducer is able to generate a signal, optionally electric, which is linked to the extent of deformation of the sensitive element 3. For example, the transducer can perceive the variation of electrical resistance resulting in the relative deformation of the first surface 3p with respect to the second surface 3s and then generate an electrical signal representative of the differential pressure between the first chamber 4 and the second chamber 5.

The casing 2 defines a fluid seal along at least a dominant portion of a peripheral edge of the sensitive element 3, thus separating the first chamber 4 from the second chamber 5, which therefore only indirectly communicate thanks to openings 4p and 4s. For example, around the peripheral edge of the sensitive element 3, a groove can be formed on the inner surface of the casing 2 in which the peripheral edge of the sensitive element 3 is housed. The side walls of this groove advantageously adhere to the peripheral edge of the sensitive element 3, thus creating a seal which separates the first chamber 4 from the second chamber 5.

In order to ensure the seal between the operating seat 160 and the casing 2 (thus preventing a fluid from reaching the inner volume 200 of the casing 2 passing through opening 6), an annular sealing lip is defined, advantageously integral with casing 2, at the second end 2z. The casing 2 therefore comprises a first seal 2p, for instance in the form of a first relief projecting from the outer surface of the casing 2, and a second seal 2s, for instance in the form of a second relief projecting from the outer surface of the casing 2, in order to create a seal respectively between the external environment and the first intake 4p and between the external environment and the second intake 5p. The first seal 2p and the second seal 2s are equal to each other, having both substantially semicircular profile and forming the annular sealing lip.

With reference to operating seat 160 which, as already mentioned, communicates with channel 70 via first passage opening 16p and second passage opening 16s, it is noted that the first cavity 160p and the second cavity 160s only communicate via said first and second passage openings and are otherwise separated in a sealed manner. In other words fluid cannot pass from first to second cavity without exiting from the operating seat 160. Consequently the first intake 4p and the second intake 5p and the first chamber 4 and the second chamber 5 are also sealingly separated and communicate only via said first and second passage openings 16p, 16s, preventing a fluid from reaching the second intake 5p starting from the first passage opening 16p through the first intake and preventing fluid from reaching the first intake 4p starting from the second passage opening 16s through the second intake. A sealing projection 2c, for example made integral with casing 2, extends on opposite sides of the tubular body 2f and along the first end 2a. This projection extends at the peripheral edge of the sensitive element 3. The sealing projection extends along a plane and along a plurality of the sides of the sensitive element 3. In the case in which the sensitive element 3 comprises a flat rectangular sheet, the sealing projection 2c extends along three of the four sides of the sheet. The casing then comprises a sealing projection in the form of a third seal 2c, in particular in the form of a third relief projecting from the outer surface of casing 2. The sealing projection or third seal 2c may thus have a substantially U-shaped profile.

The first seal 2p is arranged on a first plane incident to the plane of symmetry P, optionally orthogonal to the plane of symmetry P. The second seal 2s is arranged on a second plane incident to the plane of symmetry P, optionally orthogonal to the plane of symmetry P. The first plane is in particular substantially coinciding with the second plane. The third seal 2c is arranged on a third plane parallel to the plane of symmetry P, optionally coinciding with the plane of symmetry P. The third plane is in particular substantially orthogonal to the first plane and to the second plane. Defining "first point" and "fourth point" the points of the outer surface of the casing 2 between which the first seal 2p, develops, "second point" and "fifth point" the points of the outer surface of the casing 2 between which the second seal 2s develops, "third point" and "sixth point", the points of the outer surface of the casing 2 between which the third seal 2c develops, advantageously the third point coincides with the first point and with the second point and the sixth point coincides with the fourth point and with the fifth point. The first seal 2p and the second seal 2s are symmetric with respect to the plane of symmetry P and are located in a peripheral position with respect to opening 6.

Advantageously, meter 1 according to the present invention provides for a snap fit coupling with housing 16, which allows a solid, stable and precise installation of meter 1 inside housing 16 as an alternative to elements such as screws, which would complicate the assembly process and would lengthen the timing thereof. Moreover, the snap fit coupling is extremely convenient to perform dismantling, maintenance and/or replacement operations of meter 1 during use. More in detail, the casing 2 comprises an expanded portion 2r defined at or near the first closed end 2a of the casing 2 and adapted to be inserted with interference in the operating seat 160. Optionally, the expanded portion 2r comprises a first protuberance 200p and a second protuberance 200s symmetrically opposed to each other and intended to mate respectively with the first cavity 160p and with the second cavity 160s of the operating seat 160.

In the body 7, in particular in housing 16, a slit 170 is formed extending in length into a wall of body 7 with reduced thickness. The snap fit of meter 1 is completed by means of a clip 17, inserted from the outside into slit 170. According to a possible embodiment, the clip 17 has a substantially L shape and has a plate 17v which is designed to abut against the wall of body 7, thus remaining outside slit 170, and from which a first arm 17h and a second arm 17k branch off, which extend along a direction substantially orthogonal to plate 17v. The first arm 17h and the second arm 17k, passing through slit 170, are inserted into the operating seat 160, thus being able to cooperate with the first protuberance 200p and with the second protuberance 200s. Once clip 17 has been applied, the expanded portion 2r is inserted snap-wise into the operating seat 160 by means of clip 17.

Advantageously, the pressure differential meter 1 comprises a closing element 100 coupled to body 7. The closing element 100, in the sub-assembly shown in FIG. 1, closes the operating seat 160 which houses the casing 2 and the sensitive element 3. The closing element 100 therefore occludes opening 6, preventing the inner volume 200 of casing 2 from communicating with the external environment. Advantageously, the sensitive element 3 may be constrained to the closing element 100 (for example, it is mounted cantilevered on the closing element 100); also the transducer connected to the sensitive element 3 may be constrained to the closing element 100. The closing element 100 may be detachably engaged to the body 7, such that a separation of the closing element 100 from the main body 7 causes an extraction of the sensitive element 3 and optionally of casing 2 from the operating seat 160, such extraction, for example, taking place after removal of clip 17 from the slit 170. The detachability of the closing element 100 is extremely advantageous in that it allows both the sensitive element 3 and casing 2 to be subjected cleaning, maintenance and replacement operations.

In one embodiment of the present invention, a temperature sensor is integrated into the differential pressure meter 1. The temperature sensor is configured for sensing the temperature of a fluid flowing through channel 70. The temperature sensor may operate in the operating seat 160 and is intended to generate a further signal, optionally electric, depending on the temperature of the fluid that passes through the channel 70 (a dedicated transducer being possibly associated with the temperature sensor).

It should be noted that the pressure differential meter 1, as described above and as shown in FIG. 10 and FIG. 11, may be a distinct invention and may be used alone or in combination with systems other than the sub-assembly in FIG. 1. In fact, while the combination of the sub-assembly of FIG. 1 with meter 1 is particularly advantageous, it must be considered as representative of one of the possible uses of the differential pressure meter 1 according to the present invention. By way of non-limiting example, the scope of the present invention also includes installations of the differential pressure meter 1 on conduits of heating and/or conditioning systems according to which the pressure meter 1 does not work in combination with variators of geometric characteristics of orifices.

The assembly according to the present invention comprises a control unit 9 operatively connected to the differential pressure meter 1 and to the variator (in particular to actuator 11). This control unit 9 is only shown in FIG. 2 and is operatively connected to the differential pressure meter to receive from the latter a signal relating to the pressure difference detected by the meter device itself. The control unit is also connected to, and active in control of, the variator, to arrange the orifice in one of the aforementioned different configurations in which the orifice can be positioned, in order to perform an accurate determination of the fluid flow through the orifice on the basis of the information relating to the pressure difference measured by the meter. In greater detail, control unit (9) is configured for executing:

a measurement procedure (represented by the block diagram Pm in FIG. 16) of a real value of a quantity representative of a flow through said orifice, in particular said quantity being the flow rate passing through said channel (70), and a correction procedure of the real value of said representative quantity (represented by the block diagram Pc in FIG. 16), aimed to correct the real value of the representative quantity at least when the real value measured deviates more than a fixed limit from a desired value for the same representative quantity.

For example, with reference to the flow rate as a representative quantity, the control unit 9 is configured to execute:

a procedure for measuring the actual flow rate passing through the orifice and thus channel 70, and a flow correction procedure designed to correct the actual flow rate passing through the orifice and thus channel 70, if the actual flow deviates from a desired flow rate.

In greater detail, the control unit is configured to initially execute a calibration step (F3 in FIG. 16) of the differential pressure meter 1; this calibration step takes place in the absence of flow through channel 70 and in the absence of pressure variation upstream and downstream of an open orifice along channel 70. The calibration step is aimed at eliminating any measurement errors of the differential pressure meter 1. In conditions of absence of flow and with at least one open orifice, the detection of the differential pressure meter 1 must be equal to zero and therefore the control unit is able to compensate for a possible different value detected then in order to avoid incurring systematic errors measurement.

Going then to the measuring procedure, a step is preferably initially provided aimed to determine, among the plurality of said configurations, the current configuration of said orifice, so that the orifice configuration is known before entering in the following steps. The control unit may for example communicate with a suitable sensor (such as a position sensor or an encoder or more yet a different sensor) associated to the shutter to receive the information relating to the current configuration of the shutter.

Thereafter, and according to a first alternative, the measurement procedure of the real value of the quantity representative of the flow through said orifice comprises the following steps that unit 9 is configured for executing:

receiving the desired value of the quantity representative of flow through said orifice;

establishing whether said desired value falls within a reference range (which may be stored in a memory accessible to the control unit) of the same representative quantity measurable with the orifice in said current configuration;

if it is established that said desired value is not within the reference range of the same quantity measurable with the orifice in said current configuration, driving the variator and arranging the orifice in a different configuration;

if it is established that said desired value falls within the reference range of the same quantity measurable with the orifice in said current configuration, calculating a real value of the representative quantity as a function of the pressure difference acquired by said measurement device or pressure meter and as a function of the geometric characteristic of said orifice corresponding to said current configuration.

In other words, in the first alternative, the control unit selects the orifice to be used for the measurement of differential pressure on the basis of the desired flow value, and then calculates the real value of the representative quantity. This type of alternative presupposes that the actual flow rate value does not excessively deviate from the desired flow rate value, and thus that the direct selection of the orifice allows the measurement of the actual flow rate in a correct manner. The control unit can be configured to repeat steps b) and c) at least until the desired value falls within the measurable reference range with the orifice; in a variant, the control unit may be configured to iteratively repeat steps b) and c) or also the three steps a), b) and c) so that the shutter configuration is always appropriate to the desired value of the representative quantity, the real value of which must then be measured.

Alternatively, and according to a second, currently preferred alternative, the control unit can be configured for executing perform a measurement procedure of the real value of the quantity representative of the flow through said orifice comprising the following steps:

calculating a real value of the representative quantity as a function of the pressure difference acquired by said measurement device or pressure meter and as a function of the geometric characteristic of said orifice corresponding to said current configuration;

establishing whether said real calculated value falls within a reference range of the same representative quantity measurable with the orifice in said current configuration;

if it is established that said calculated value is not within the reference range of the same quantity measurable with the orifice in said current configuration, driving the variator and arranging the orifice in a different configuration;

if it is established that said calculated value is within the reference range of the same quantity measurable with the orifice in said current configuration, considering said real value calculated as a correct measurement of the real value of the quantity representative of the flow through said orifice.

An example of this second alternative will be described below in detail with reference to FIG. 16. The control unit can be configured to iteratively repeat steps a), b) and c) of this second alternative procedure so that the shutter configuration is always appropriate to the measure of the real value of the representative quantity.

Once the correct measure of the real value of the representative quantity has been determined, the control unit is configured for executing the correction procedure of the real value of said representative quantity.

It should be noted that while the measurement procedure is repeated iteratively so that the actual value of the representative quantity is always available, the control unit can be configured for executing the correction process at predetermined time intervals, or only when the deviation between the desired quantity value deviates considerably from the one measured.

In any case, the correction procedure comprises the steps of comparing the actual value as calculated, which is obtained in said step of calculating an actual value of the representative quantity, with a target value to determine a possible error (the target value may be the above desired value set by the user or a result of processing made by another calculation unit). If the error is greater than a predetermined threshold, the control unit is configured to act on regulator 8 to increase or decrease the actual flow value in order to reduce or zero said error.

In terms of connections, control unit 9 is configured for receiving (through line 9*p*) an input signal (which may optionally be an electric or electromagnetic signal), containing the differential pressure measurement from the differential pressure meter 1. The control unit 9 is also connected to the variator and is configured for transmitting (via line 9*s*) an output signal to actuator 11 of the variator aimed at moving the shutter to the configuration subsequent to the current configuration, of course if it has been verified that the current configuration is not suitable for the measurement. The control unit 9 may also be operatively connected with the temperature sensor (or with the respective transducer), so as to be able to receive the temperature signal generated by the same temperature sensor; the control unit is further configured to also take into account the temperature information detected by the temperature sensor and brought by the temperature signal for calculating energy parameters such as the delivered power of the flow passing through channel 70. In addition, the control unit may take into account the temperature of the fluid and therefore the temperature signal coming from the temperature transducer for the calculation of the mass flow through the conduit.

The control unit 9 may also be operatively connected to an external controller (such as the control system 24 which will be described below), thus being configured for receiving from such external controller (through line 9*t*) a further input signal (which may be an electric or electromagnetic signal) aimed at setting a reference value of the quantity representative of the flow through channel 70 (preferably a reference value of the flow through channel 70). It should be noted that as an alternative, the same control unit 9 may be configured for receiving directly from a user the above second input signal relative to a reference value of the quantity representative of the flow through channel 70 (for example, a desired value of flow rate through channel 70). As already mentioned, the control unit 9 can finally be operatively connected to a device for regulating a quantity representative of the flow through the orifice (in particular, the flow rate through the orifice); the device for regulating may be an element separate from the sub-assembly according to the invention or may comprise a regulator 8 (or ball valve) integrated in the assembly which will be described below.

The combination according to the present invention of a pressure differential meter 1 and a variator of a geometric characteristic of said orifice overcomes the problem of too small detection ranges, while retaining accuracy of the measurements.

In the case of a variator configured for varying the geometric characteristic of the orifice according to discrete steps, the overall detection range of meter 1 may nevertheless be continuous.

Figure 13:
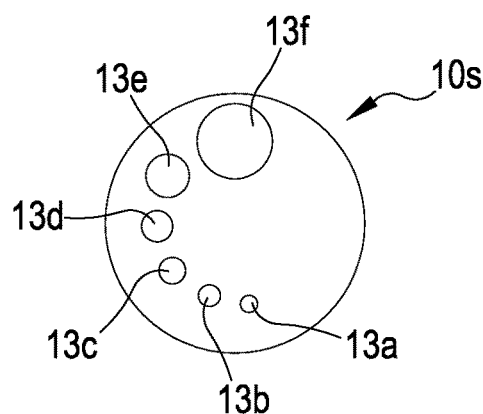
FIG. 13 is a detailed view of a component of the assembly.

Therefore, by using, for example, the second selector element 10*s* in FIG. 13, the predefined geometric characteristics of the calibrated holes 13*a*, 13*b*, 13*c*, 13*d*, 13*e*, 13*f* can be such that:

the values of the quantity representative of a flow of the detection range corresponding to the first hole 13*a* are generally lower than the values of the quantity representative of a flow of the detection range corresponding to the second hole 13*b*;

the values of the quantity representative of a flow of the detection range corresponding to the second hole 13*b* are generally lower than the values of the quantity representative of a flow of the detection range corresponding to the third hole 13*c*;

the values of the quantity representative of a flow of the detection range corresponding to the third hole 13*c* are generally lower than the values of the quantity representative of a flow of the detection range corresponding to the fourth hole 13*d*;

the values of the quantity representative of a flow of the detection range corresponding to the fourth hole 13*d* are generally lower than the values of the quantity representative of a flow of the detection range corresponding to the fifth hole 13*e*;

the values of the quantity representative of a flow of the detection range corresponding to the fifth hole 13*e* are generally lower than the values of the quantity representative of a flow of the detection range corresponding to the sixth hole 13*f*;

there is overlap between a limited portion of the detection range corresponding to the first hole 13*a* and a limited portion of the detection range corresponding to the second hole 13*b*;

there is overlap between a limited portion of the detection range corresponding to the second hole 13b and a limited portion of the detection range corresponding to the third hole 13c;

there is overlap between a limited portion of the detection range corresponding to the third hole 13c and a limited portion of the detection range corresponding to the fourth hole 13d;

there is overlap between a limited portion of the detection range corresponding to the fourth hole 13d and a limited portion of the detection range corresponding to the fifth hole 13e; and there is overlap between a limited portion of the detection range corresponding to the fifth hole 13e and a limited portion of the detection range corresponding to the sixth hole 13f.

According to a further aspect, during the transition from one hole to the next, it is possible to provide not to have a zero flow rate in order to avoid a total shut-off of the flow, with consequent sudden increases in pressure that could cause damage to the circuit or otherwise undesired noise. In other words, the selector can be configured in such a way that during the displacement of from one position to the next, at least a slight passage of fluid through channel 70 is maintained.

Figure 15:
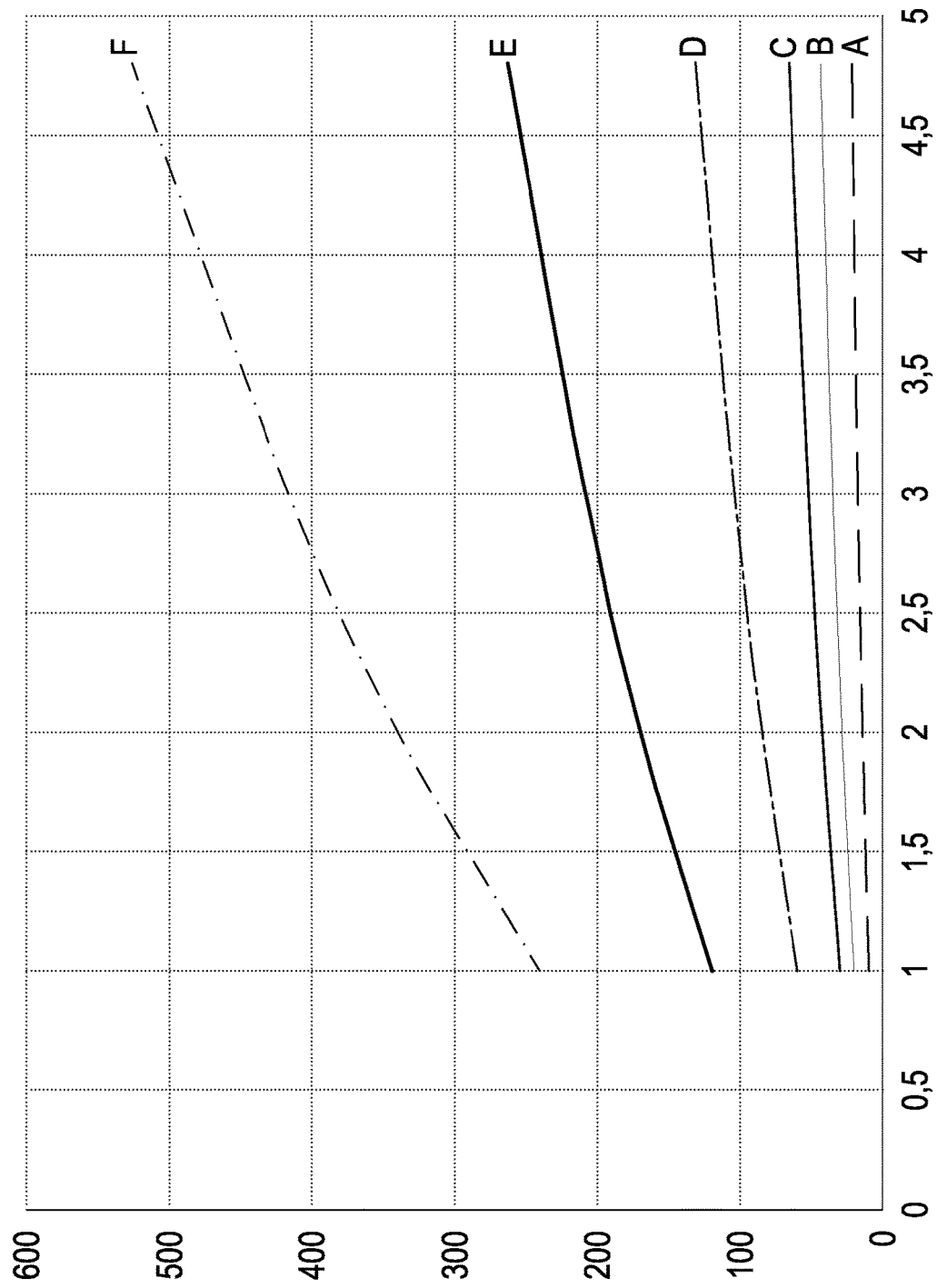
FIG. 15 is a graph which shows the detection range of an assembly.

The detection ranges associated to each hole 13a, 13b, 13c, 13d, 13e, 13f (and thus the overall detection range allowed) are shown by respective curves A, B, C, D, E, F in the chart in FIG. 15, where the abscissae represents the differential pressure Δp at the calibrated orifice heads (expressed in kPa) and the ordinates the detectable flow rate Q (expressed in l/h). In the non-limiting example, as the minimum differential pressure limit Δp reasonably allowable at the heads of each hole 13a, 13b, 13c, 13d, 13e, 13f, a value equal to 1 kPa is adopted, thus following the suggestion of the BSRIA guide "Commissioning Water Systems", which considers 1 kPa the minimum differential pressure value Δp allowable to provide accurate flow information with the measurement instruments traditionally installed in heating and/or conditioning systems (although in reality the pressure differential meter 1 according to the present invention is capable of detecting with accuracy and precision pressure differential values Δp even lower than 1 kPa). As a maximum differential pressure limit Δp reasonably acceptable at the heads of each hole 13a, 13b, 13c, 13d, 13e, 13f, a value of 4.8 kPa may be adopted to prevent using circulation members with high prevalence in the heating and/or conditioning systems which would result in unnecessary pumping energy waste. Nothing prevents adoption of even greater Δp values.

The range of the ordinates corresponding to curve A represents the range of detectable flow rates through the first hole 13a. The range of the ordinates corresponding to curve B represents the range of detectable flow rates through the second hole 13b. The range of the ordinates corresponding to curve C represents the range of detectable flow rates through the third hole 13c. The range of the ordinates corresponding to curve D represents the range of detectable flow rates through the fourth hole 13d. The range of the ordinates corresponding to curve E represents the range of detectable flow rates through the fifth hole 13e. The range of the ordinates corresponding to curve F represents the range of detectable flow rates through the sixth hole 13f. Finally, the range from the smaller ordinate corresponding to curve A up to the greater ordinate corresponding to curve F represents the range of the flow rates detectable as a whole using the differential pressure meter 1.

Each curve shown in FIG. 15 follows in particular the following mathematical relationship:

$$Q = \frac{Kvs * \sqrt{\Delta p}}{36}$$

In this relationship, Kvs is a characteristic parameter of the orifice (corresponding to the flow rate in $m^3/h$ when at the heads of the calibrated orifice there is a differential pressure of 1 bar) and is determined in the laboratory. Δp is expressed in KPascal and the flow rate Q in liters/second. The Kvs parameter of each hole 13a, 13b, 13c, 13d, 13e, 13f of the second selector element 10s (and possibly also of opening 12 of the first selector element 10p) is then determined and verified in the laboratory in a calibration step of the sub-assembly according to the present invention, at the end of which each hole 13a, 13b, 13c, 13d, 13e, 13f can act as a calibrated orifice.

Figure 6:
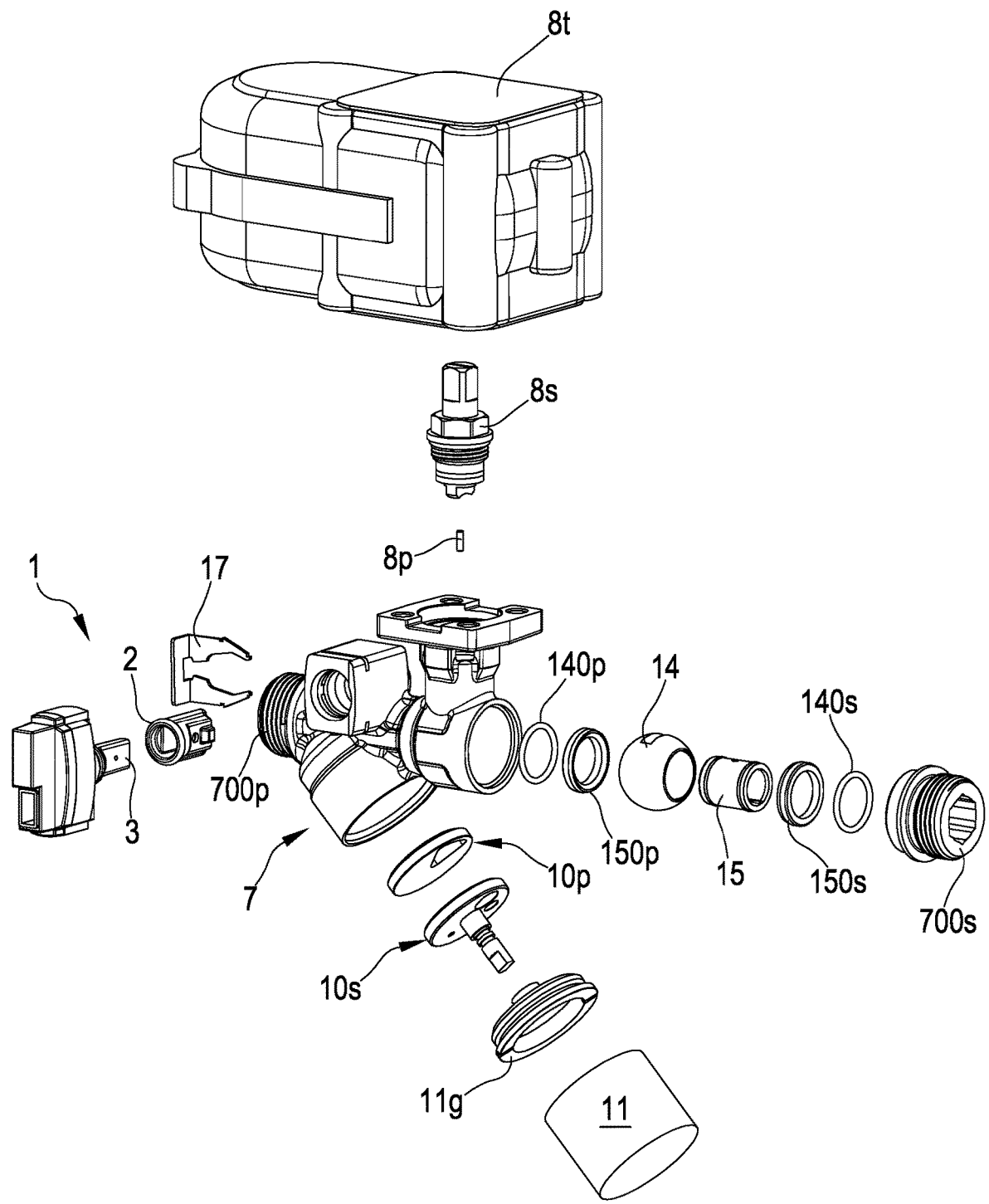
FIG. 6 to FIG. 9 show an assembly according to an embodiment of the invention.
Figure 7:
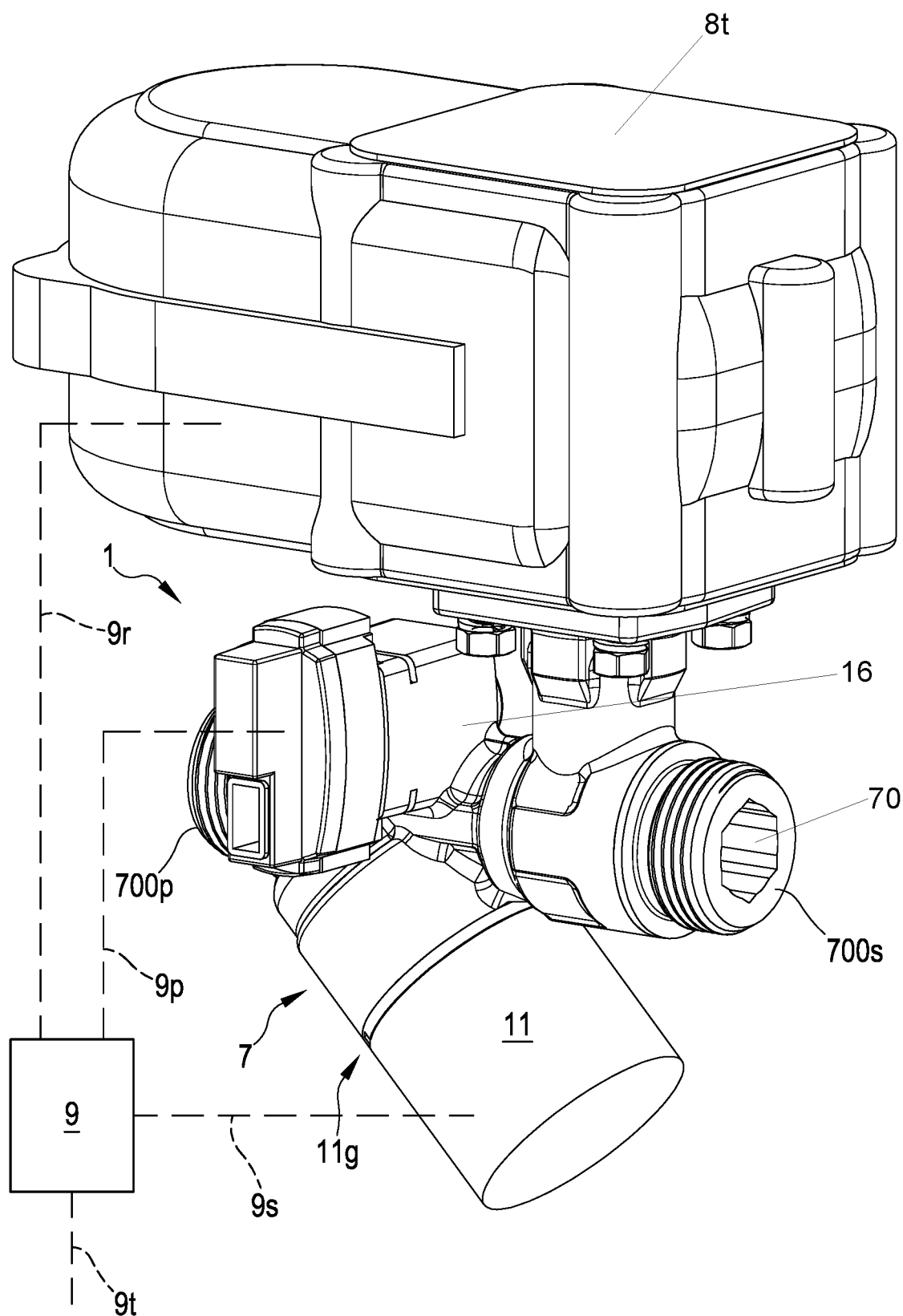
Figure 9:
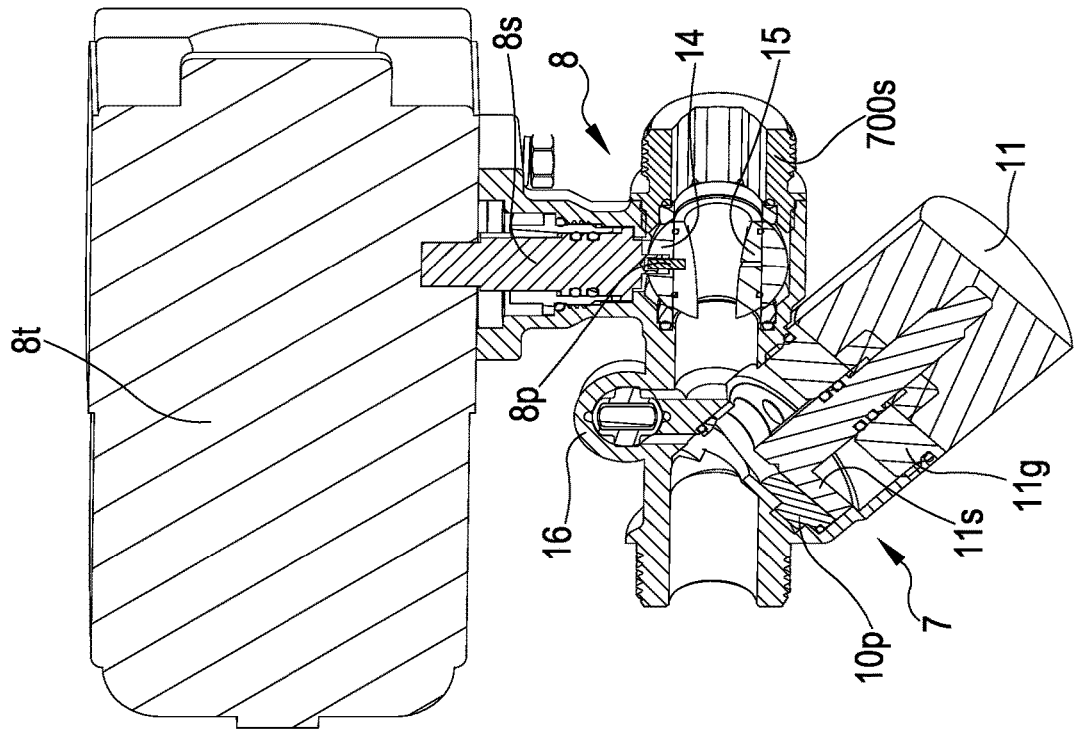
Figure 8:
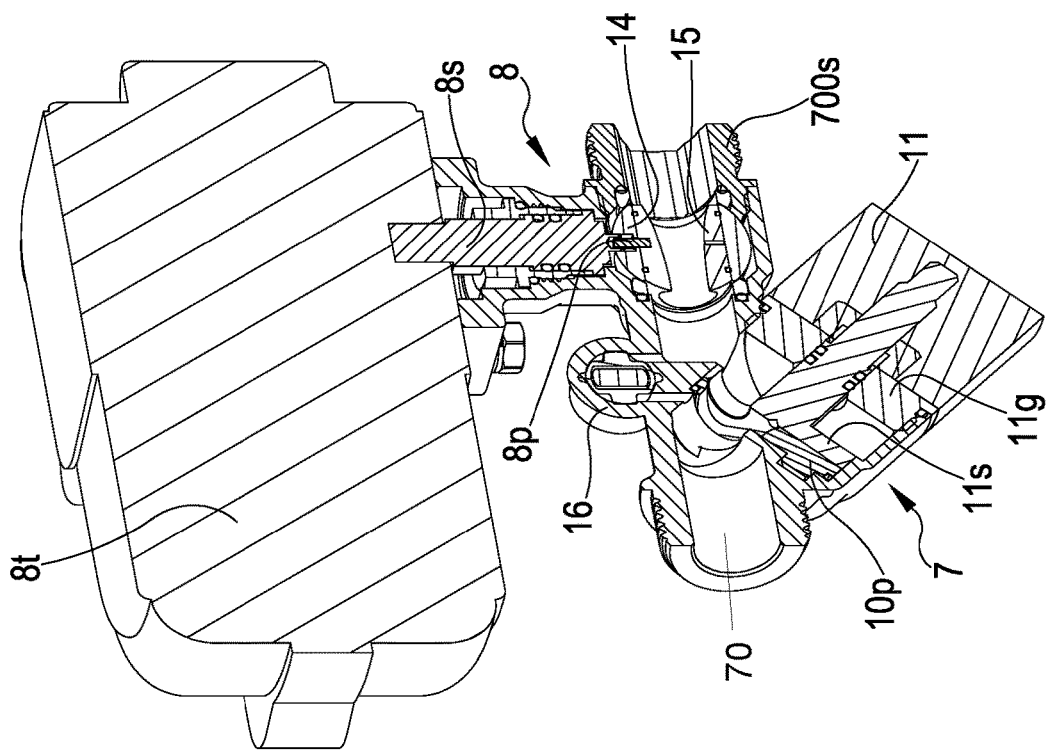

FIG. 6 shows, in particular with exploded view, an assembly according to the present invention. This assembly is configured to be installed on a conduit of a heating and/or conditioning system and its primary function is detection and regulation of at least one quantity (e.g., flow rate) representative of the flow that crosses the conduit on which the assembly is installed. The assembly shown in FIG. 6 is further shown in the isometric view in FIG. 7 and in the sectional views in FIG. 8 and FIG. 9.

The assembly according to the invention comprises the components of the sub-assembly described above (in particular, body 7, the differential pressure meter 1 and the drive variator of the geometric characteristic of said orifice), in combination with a regulator 8 of a quantity representative of the flow through the orifice, such a representative quantity being in particular the flow rate. The components in common to the sub-assembly and the assembly will not be further described, all the features of such components already described with reference to the sub-assembly according to the invention being fully valid in the assembly according to the present invention. Moreover, the common components in the assembly retain all the reference numerals used above.

Following the direction of the flow along channel 70, fluid flow first encounters the calibrated orifice, and then regulator 8. Therefore, in the representations of the assembly (for example in the sectional views referred to in FIG. 8 and FIG. 9), regulator 8 is arranged in body 7 so as to carry out its action between the second region 7s and the outlet opening 7z. However, it is equally possible that, within the assembly, regulator 8 is arranged within body 7 so as to carry out its action between the inlet opening 7a and the first region 7p.

Regulator 8 comprises a valve suitable for choking and/or interrupting the flow in output from channel 70. Advantageously, this valve is of the ball type, with a ball 14 and a characterized insert 15 placed within ball 14.

The ball valve (an occluder of different shape could alternatively be used instead of the ball, such as a drawer valve or a gate valve or a different three-dimensional body) and the operation thereof are known per se in the technical field of heating and/or cooling systems. Body 7 comprises a dedicated seat for housing the ball valve. Actuator 8t of ball valve is mounted on body 7, for example by means of fixing nuts and washers and is connected to a manoeuvring rod 8s and then to a centring pin 8p. Other alternative mechanical fastening elements may be provided. By such a kinematic mechanism, actuator 8t of the ball valve is thus able to cause a rotation of ball 14 and consequently a change in the orientation of the characterized insert 15 with respect to channel 70: each orientation of the characterized insert 15 corresponds to a specific flow rate in output from channel 70. The ball valve thus exerts its action of flow regulation, between a minimum flow rate value (corresponding generally to a zero flow in output from channel 70) and a maximum flow rate value (corresponding to the flow rate value in output from channel 70 that could result if the ball valve was absent, except for pressure losses). In order to prevent leakage of fluid and keep ball 14 in the correct position, a first gasket 140p (e.g. an O-ring, preferably made of elastomer) and a first ring 150p (e.g. PTFE) are arranged upstream of the characterized insert 15, while a second gasket 140s (e.g. an O-ring, preferably made of elastomer) and a second ring 150s (e.g. PTFE) are arranged downstream of the characterized insert 15. As is visible in FIG. 7, the control unit 9 of the assembly according to the present invention is operatively connected to regulator 8 and is further configured for generating a further output signal, which may be for example an optical or an electromagnetic signal, (in addition to the signal directed to the variator). The control unit is further configured for transmitting (through line 9r) this additional output signal to actuator 8t of the ball valve in order to correct and possibly cancel the error between the actual value and desired value of the flow rate (or other characteristic quantity). Therefore, in the assembly according to the present invention, the control unit 9 is configured for receiving an input signal from the pressure meter 1. The input signal carries the differential pressure (and optionally temperature) information of the fluid passing through the orifice. The control unit is further configured having or receiving a further input signal from the outside which carries information relating to the desired characteristic quantity value. The control unit 9 is then configured for generating an output signal intended to control the variator, so that the geometric characteristic of the orifice is varied according to the value of the quantity to be measured. In addition, unit 9 generates a further output signal to regulator 8, so that the quantity representative of the flow through channel 70 is adjusted as described above.

Figure 14:
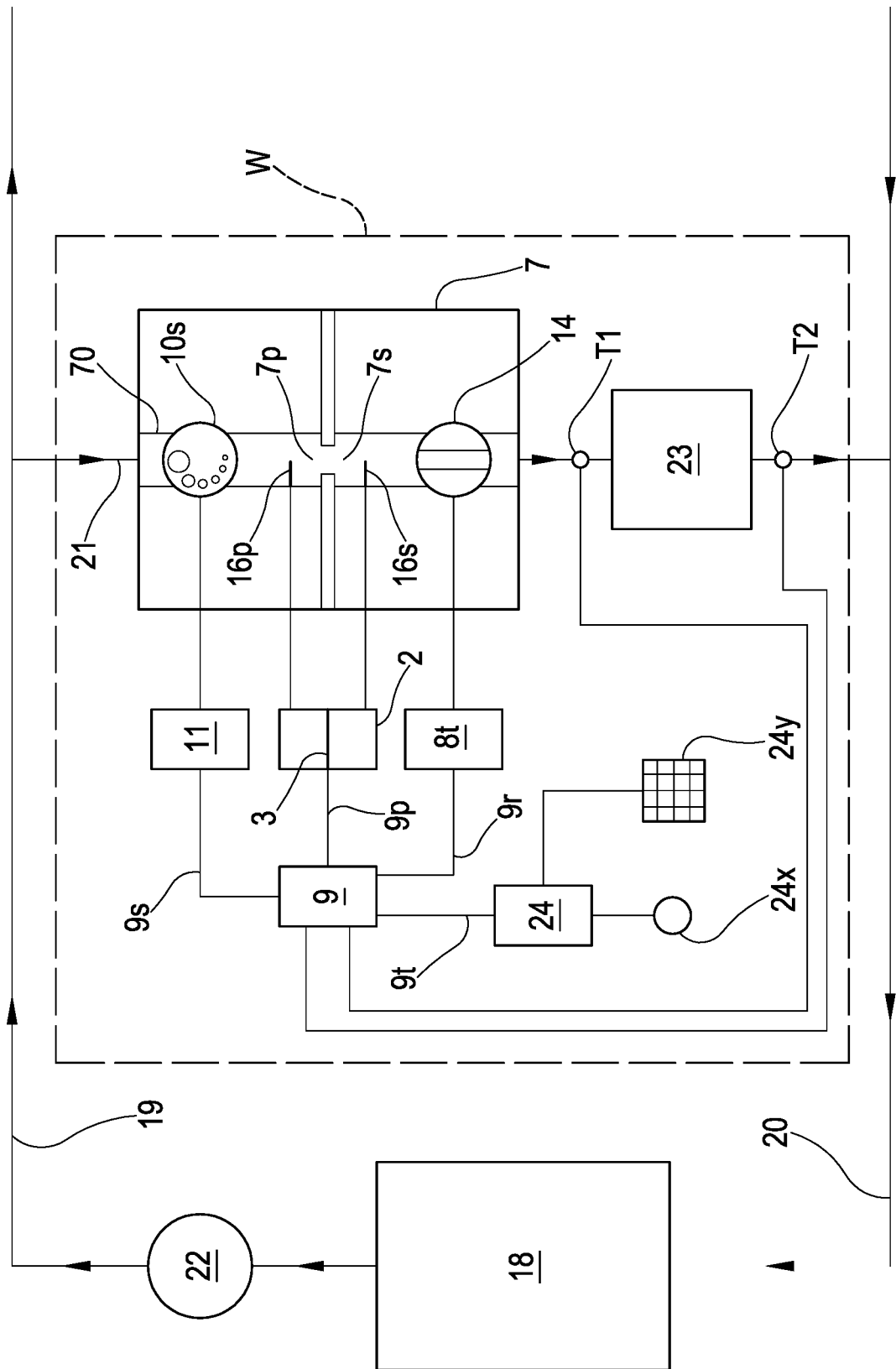
FIG. 14 schematically shows the architecture of a system.

FIG. 1 shows a heating and/or conditioning system according to the present invention. This system comprises a heat power and/or cooling power generator, such as a boiler 18. The generator is part of a closed circuit, together with a circulation member, for example a pump 22, suitable for circulating the process fluid (typically water) in the closed circuit. A delivery line 19 and a return line 20 branch off the generator. The delivery line 19 is connected to the outlet of the generator, while the return line 20 is connected to the inlet of the generator. The circulation member, in the example in FIG. 14, is applied to the delivery line 19. Alternatively, the circulation member may be applied to the return line 20. The delivery line 19 and the return line 20 are connected by means of a plurality of service lines, each of which is intended to serve at least a respective user. Each respective user releases to the environment where the user is installed, a fraction of the heat and/or cooling power generated by the generator and conveyed by the circulation member.

In FIG. 14, a service line 21 is connected between the delivery line 19 and the return line 20 and a user is arranged in the service line 21 and within environment W (environment W could be a house room, or an environment in a public building such as a hotel, a hospital or a shopping mall). The user may comprise a heat exchanger 23, which may for example be a fan coil unit or a radiator (wall or floor or ceiling mounted). In the service line 21 there is further arranged an assembly according to the present invention, for example the assembly referred to in FIG. 6. The assembly is installed in the service line 21 in such a way that the fluid, by circulating along the service line 21, crosses the first region 7p first and then the second region 7s. Therefore, by placing regulator 8 in body 7 between the calibrated orifice and the outlet opening 7z, the fluid circulating along the service line 21 first passes through the calibrated orifice and then through regulator 8. The assembly and the user are mutually connected in series. In the example shown in FIG. 14, the assembly is installed in the service line 21 upstream of the/each user. Alternatively, the assembly may be installed in the service line 21 downstream of the/each user.

Moreover, in addition to a first temperature sensor (which may be incorporated in meter 1 or, for example, positioned as shown in FIG. 14) and in order to allow detection of the temperature variations between delivery line and return line, it is possible to provide a further temperature sensor T2 along each service line 21, for example downstream of the heat exchanger 23. On the basis of the temperature detection upstream T1 and downstream T2 of the/each heat exchanger 23, and on the basis of the actual flow of fluid determined as described above, the control unit 9 can be configured for calculating the actual energy supply or energy absorption for each line 21.

As shown in FIG. 14, the system further comprises a control system 24 operatively connected to the control unit 9 (it should be noted that the two systems may consist of a single control unit or two separate units, as illustrated) by means of line 9t, the control unit 9 also being connected to the differential pressure meter 1, to the regulator and to the variator, respectively by means of lines 9p, 9s, 9r. Advantageously, the control system 24 is also operatively connected to at least one selector 24y for an operator to select at least one desired environmental parameter (for example the temperature or relative humidity) into room W, and to at least one probe 24x, for acquiring one real environmental parameter (for example the temperature or relative humidity) of the real environment W. Selector 24y and probe 24x are represented in FIG. 0.14 as separate from other system components. However, selector 24y and probe 24x may be integrated with other components of the system, in particular with the user and/or the control system 24.

The control system 24 is adapted to calculate the desired value or the target value of the quantity representative of the flow through the service line 21 (and thus through channel 70), depending on the heating and/or cooling power to be released through the utility in environment W (in this case, the additional heat probe T2 described above will be required). The quantity representative of the flow (of which the control system 24 calculates the desired value or the target value) may be the flow rate. The heating and/or cooling power used for the calculation of the quantity representative of the flow is/are automatically defined by the control system 24, for example as a function of the detection of probe 24x. Alternatively or in addition, the heating and/or cooling power used for the calculation of the quantity representative of the flow is automatically defined by the control system 24 according to an selection operation performed by an operator, for example according to the environmental parameter set by the operator by means of selector 24y. Consequently, the first output signal and the second output signal generated by the control unit 9 take into account not only the detection of the differential pressure meter 1 (and the temperature sensor possibly integrated to the latter), but also, due to the calculation of the control system 24, and thus encoded in the second input signal, the actual and/or desired environmental parameters into the room W.

The control method of the assembly according to the present invention, when installed in a conduit of a heating and/or of conditioning system of a room, has inventive features.

In a first step of the method according to the invention, the current configuration among the plurality of different configurations in which the orifice can be placed by means of the variator, as well as the corresponding geometric characteristic of the orifice are determined; the geometric characteristic may comprise one or more of: a linear characteristic dimension of the orifice (such as the diameter), a characteristic area of the orifice (such as the area of the fluid passage section) and an orifice shape.

Once the current geometric characteristic of the orifice has been determined, in a second step of the method according to the invention, the differential pressure meter 1 acquires the current value of the pressure difference between a first region 7p and a second region 7s inside body 7 (located upstream and downstream of the orifice, respectively); then a real value of a quantity representative of the flow (preferably the flow) through the orifice is calculated, as a function of the current pressure difference and as a function of the current geometric characteristic of the existing orifice. If the differential pressure meter 1 is associated with a temperature sensor for detecting the temperature of a fluid passing through channel 70, the real value of the quantity representative of the flow can also be conveniently calculated taking into account the temperature; moreover, using a temperature sensor placed upstream T1 and one downstream T2 of the utility present on each service line (or a similar differential temperature sensor), it is possible to determine and/or control an energy parameter (e.g., absorbed or delivered heat power) as a function of the flow through each user and the thermic jump astride each user. It is also possible, as an alternative to have the second step based on the real value of the quantity representative of the flow, that the second step be based on the desired value of the quantity representative of the flow. In this variant, the second step of the method provides to receive a desired value of a quantity representative of a flow (preferably the flow) through the orifice: the desired value may be calculated on the basis of an operating parameter of the heating and/or conditioning system and/or on the basis of an environmental parameter of the room served by this system.

In a third step of the method according to the invention, provision is made to determine whether the real value of the quantity representative of the flow falls or not within a reference range of the same quantity measurable with the orifice in the current configuration; the reference range may be calculated on the basis of an operating parameter of the heating and/or conditioning system and/or on the basis of an environmental parameter of the room served by this system. If the method has followed the simplified variant described with reference to the preceding second step, the comparison is carried out between the desired value of the quantity representative of the flow and the reference range of the same quantity measurable with the orifice in the current configuration.

If the reference range of the quantity measurable with the orifice in the current configuration does not include the real value (or the desired value, according to the simplified variant of the method) of the quantity representative of the flow, a fourth step of the method according to the invention is carried out. According to this fourth step, the variator is operated to cause a variation arranging the orifice in a different configuration. Preferably, this variation increases the value of the geometric characteristic of said orifice and/or modifies the shape of the orifice so as to increase the fluid passage section through the orifice and/or reduce the load losses at the orifice. Depending on the type of variator used for the variation of the configuration of the orifice, the geometric characteristic of the orifice may be varied discretely between a plurality of predefined geometric characteristic values or it may be varied in a continuous manner within a range of predefined geometric characteristic values: the range of values is defined by a first predefined geometric characteristic value taken as the lower limit and by a second predefined geometric characteristic value taken as the upper limit of the same range.

All steps from the first step to the fourth step may be iteratively repeated, as long as the reference range of the quantity measurable with the orifice in the current configuration is external to the real value (or to the desired value, according to the simplified variant of the method) of the quantity representative of the flow through the orifice.

When the reference range of the quantity measurable with the orifice in the current configuration includes the real value (or the desired value, according to the simplified variant of the method) of the quantity representative of the flow through the orifice, a fifth step of method according to the invention is carried out, in which the real value calculated in the second step is considered a correct measure of the quantity representative of the flow (preferably the flow rate) through the orifice. If, instead, the second step has taken place on the basis of the desired value of the quantity representative of the flow, the fifth step acquires, by means of the pressure meter 1, the pressure difference between the first region 7p and the second region 7s and then calculates a real value of the quantity representative of the flow (preferably the flow rate) through the orifice. The calculation is made as a function of the pressure difference acquired, as a function of the currently selected geometric characteristic of the orifice and optionally also as a function of a temperature of the fluid passing through channel 70 (if the differential pressure meter 1 is associated to a temperature sensor for the detection of the temperature of a fluid passing through channel 70).

The method according to the present invention comprises a sixth step in which the real value obtained in the fifth step is compared with a target value to determine a possible error. The target value may be calculated on the basis of an operating parameter of the heating and/or conditioning system and/or on the basis of an environmental parameter of the room served by this system. The target value may coincide with the desired value of the quantity representative of the flow (preferably the flow rate) through the desired orifice.

Once the error has been determined, it is then determined whether the error is, in absolute value, greater than a predetermined threshold; the predetermined threshold may be calculated on the basis of an operating parameter of the heating and/or conditioning system and/or on the basis of an environmental parameter of the room served by this system. In case the error is greater than the predetermined threshold, a seventh step is carried out which uses regulator 8 of the quantity representative of the flow through the orifice (preferably the flow rate) to increased or decreased the value of said representative quantity.

Before executing the steps of the method described above, a calibration step of the differential pressure meter 1 may be carried out; this calibration step takes place in the absence of flow through channel 70 and in the absence of pressure variation upstream and downstream of an open orifice along channel 70. The calibration step is aimed at eliminating any measurement errors of the differential pressure meter 1. In conditions of absence of flow and with at least one open orifice, the detection of the differential pressure meter 1 must be equal to zero and therefore it is possible to compensate for a possible different value detected in order to avoid incurring into systematic errors measurement.

In the control unit 9 of the assembly according to the present invention (shown in FIG. 7), an executable code is advantageously embedded adapted to allow the assembly according to the present invention to implement the method described above.

Figure 16:
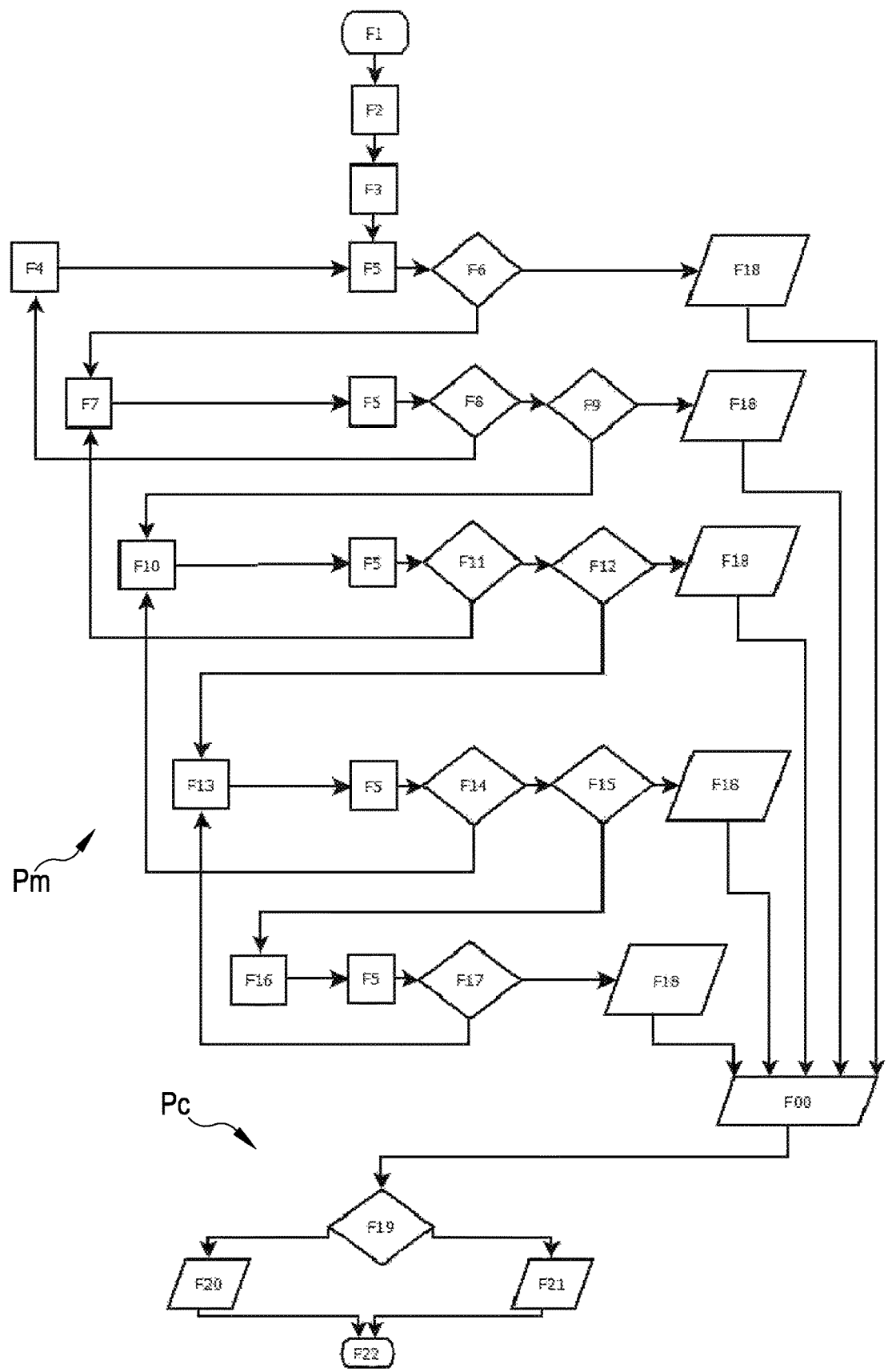
FIG. 16 is a flowchart that shows the steps of a method.

The flowchart in FIG. 16 is an algorithm, which constitutes a possible embodiment of the method according to the present invention; the algorithm described below and shown in the exemplary flowchart in FIG. 16 also shows steps that the control unit 9 is configured to execute. If the control unit comprises a digital microprocessor unit (or CPU), a suitable memory may be provided (connected to unit 9 or part of unit 9) comprising instructions executable by the control unit itself which instructions, when executed by the control unit, make the control unit capable of executing the algorithm described herein. The algorithm may be implemented using a variator capable of varying the geometric characteristic of the orifice in a discrete manner, in particular in combination with a variator (similar to the one belonging to the assembly shown in FIG. 6) capable of varying the geometric characteristic of the orifice among a plurality of different predefined geometric characteristics, each of which is represented by a respective calibrated hole.

Also in this case, reference will be made by way of example to the flow rate as the representative quantity. Block F1 represents the start of the algorithm. In block F2, the variator is activated in such a way that the calibrated hole having the minimum geometric characteristic Kv1 is available and may be crossed by flow; the mentioned calibrated hole is suitable to measure flow rates of between Qm and 2.2 times Qm, Qm being the minimum flow detectable by means of the meter device (such a meter device preferably being capable of detecting a differential pressure as meter 1 described above). In block F3, the calibration of the meter device is carried out. In each block F5, a real flow rate value Q is acquired by the meter device. It should be noted that the algorithm comprises a plurality of levels, in particular equal to the number of holes or characteristics selectable by the variator: in each of these levels of the algorithm (in the example shown, the levels are 5 as shown in FIG. 16), a respective block F5 is provided which, on the basis of the differential pressure signal coming from the differential pressure meter establishes a real value flow rate value Q which, however, will have to undergo a validation as described below. The number of holes and thus levels in the algorithm, as well as the specific flow range measurable with each hole are purely indicative as they can vary depending on the needs. With reference to the first level of the algorithm, in block F6 it is determined whether Q is less than 2.2*Qm (this value represents the reference range of flow rate values measurable with the first hole or with the first characteristic Kv1). In the negative case, in block F7 the variator is activated to move to the calibrated hole having the geometric characteristic Kv2, namely the calibrated hole having the geometric characteristic immediately higher than the geometric characteristic Kv1 and adapted to be used to measure flow rates of between 2 times Qm and 4.4 times Qm. In block F5 of the second level of the algorithm, in cascade to block F7, a real flow rate value Q is again acquired by the meter device. In block F8, it is determined whether Q is greater than 2*Qm. In the negative, the algorithm moves to block F4 in which the variator is activated to move again and position to the calibrated hole having the geometric characteristic Kv1. In block F5 in cascade to block F4, a new real flow rate value Q is acquired through the meter device (for example through a new detection of a differential pressure), which replaces the real value previously acquired. The algorithm then returns to block F6 for a new comparison. In the case of a positive outcome of comparison at block F8, the algorithm moves to block F9 in which it is determined whether Q is less than 4.4*Qm. In the negative, in block F10 the variator is activated and moved to the calibrated hole having the geometric characteristic Kv3 available to the flow, namely the calibrated hole having the geometric characteristic immediately higher than the geometric characteristic Kv2 and adapted to be used to measure flow rates of between 4 times Qm and 8.8 times Qm. In block F5 of the third level of the algorithm, in cascade to block F10, a real flow rate value Q is again acquired by the meter device. In block F11, it is determined whether Q is greater than 4*Qm. In the negative, the algorithm returns to block F7 in which the variator is activated to move to the calibrated hole having the geometric characteristic Kv2. In the case of a positive comparison at block F11, the algorithm instead moves to block F12 in which it is determined whether Q is less than 8.8*Qm. In the negative, the iterative procedure continues until a predetermined number n of iterations is reached. In block F13 the variator is activated select the calibrated hole having the geometric characteristic Kv_n, namely the calibrated hole adapted to be used to measure flow rates of between $2^{(n-1)}$ times Qm and $1.1*(2^n)$ times Qm. In block F5 of the nth level of the algorithm, in cascade to block F13, a real flow rate value Q is again acquired by the meter device. In block F14, it is determined whether Q is greater than $2^{(n-1)}*Qm$. In the negative, the variator is activated to select the calibrated hole having the geometric characteristic Kv_(n−1). In the case of a positive comparison at block F14, the algorithm moves to block F15 in which it is determined whether Q is less than $1.1*(2^n)*Qm$. In the negative, in block F16 the variator is activated to make the calibrated hole having the geometric characteristic Kv_(n+1) available to the flow, namely the calibrated hole having the geometric characteristic immediately higher than the geometric characteristic Kv_n and adapted to be used to measure flow rates of between $2^n$ times Qm and $1.1*[2^{(n+1)}]$ times Qm. In block F5 of the further level of the algorithm, in cascade to block F16, a real flow rate value Q is again acquired by the meter device. In block F17, it is determined whether Q is greater than $(2^n)*Qm$. In the negative, one returns to block F13 in which the variator is activated to select the calibrated hole having the geometric characteristic Kv_n. At the first positive comparison in blocks F6, F9, F12, F15, F17, one moves to block F18 (for example, a respective block F18 may be provided for each level, in output respectively from each of the blocks F6, F9, F12, F15, F17) in which it is determined that the real flow rate value Q is a valid value, since the measurement of this flow rate took place with a calibrated hole having the correct geometric characteristic. The procedure described above (blocks F4-F18, optionally blocks F1-F18) forming part of the algorithm is therefore the measurement procedure (Pm in FIG. 16) of the flow rate (or other quantity representative of the flow). The Ps measurement procedure can be repeated iteratively and does not stop or if it stops, it stops for a limited interval: in other words, the CPU can be configured to repeat continuously or at relatively close intervals of time (for example every minute) the measurement process so as to always make available a valid updated flow measurement also if the flow conditions inside the conduit in which the assembly according to the invention vary over time. According to a further aspect, it is also provided that the algorithm comprises a correction procedure Pc. The control unit may be configured to start (block F00 of start procedure Pc) the correction procedure upon the occurrence of one or more of the following events: at predetermined intervals, when a specific request is made by an operator that is receiving a command, when a new real value of the flow rate measured with the measurement procedure Pm is available, when a new desired flow rate value is received. For example, with reference to FIG. 16, the algorithm provides that in block F19, it is determined whether the difference in absolute value between the target flow rate value and the real flow rate value Q made available as described above is lower than a threshold. In the negative case, in block F20 the regulator is activated to regulate the flow rate so as to make the difference in absolute value between the target flow rate value and the real flow rate value Q lower than the threshold. In the positive case, instead, in block F21 the real flow rate Q is maintained without making any adjustment to the flow. Block F22 represents the end of the flow rate adjustment algorithm. While the measurement procedure may continue to be performed over time in an iterative manner without interruption, the correction procedure can be controlled as described above.

In particular, according to an optional aspect, the correction procedure of the algorithm is activated, in the example described herein by the CPU, only in case of necessity to adapt the flow rate to the desired value, while the flow measurement algorithm proceeds in an iterative manner with continuity being preferably always running.

The invention described in detail fully achieves the purposes for which it was conceived and has considerable advantages over the prior art.

The differential pressure meter described herein has a wide range of measurement, a rather low value of minimum detectable differential pressure and a high resolution. The differential pressure meter according to the present invention also has the advantage of being suitable for integration in management systems for heating and/or conditioning systems. Additionally, the pressure meter described herein allows implementing compact structures also with very close pressure intakes.

The assembly and to the relative control method described herein allow carrying out an efficient measurement of the flow in real time and without human intervention and also adjusting the flow rate or other parameters in an automated manner.

The present invention lends itself to numerous variants that can be implemented by a man skilled in the art of heating and/or cooling systems and that fall within the protective scope defined by the following claims.

For example, according to a possible and alternative embodiment (shown in FIGS. 17-20), the variator may be of the type described below. The remaining components of the sub-assembly referred to in FIGS. 17-18 and in FIGS. 19-20 are similar to those previously described and are therefore not described in detail again. Conversely, the variator used in the variants referred to in FIGS. 17, 18 and 19, 20 comprises a rotary selector 50 rotatably mounted in body 7 and operating between the inlet opening 7a and the outlet opening 7z so as to intercept the fluid passing through channel 70; it should be noted that intercepting means that the flow passing through channel 70 is forced to hit the rotary selector. The rotary selector 50 comprises a lateral wall 51 having an outer cylindrical shape; in practice, the lateral wall is a tube and delimits an inner cavity 52 that faces towards channel 70. The lateral wall 51 has through holes 53 passing through the thickness of the lateral wall itself: the figures show circular holes of progressively increasing diameter moving along the development of the lateral wall 51. In practice, the rotary selector 50 is mounted inside body 7, so as to take a plurality of angular positions with respect to the same body 7 so that, at each of these angular positions, there is a respective one of the through holes that allows placing the inlet opening 7a in flow communication with the outlet opening 7z.

The through holes 53 comprise a plurality of holes having a mutually different net passage section and, as has already been mentioned, they may be circular holes with a diameter progressively increasing from the smallest hole in the largest hole progressing around the lateral wall. The number of through holes 53 corresponds to the number of default values of the geometric characteristic (which in this case is the net fluid passage area) of the orifice: in practice, as the rotary selector rotates, the net fluid passage area through channel 7 corresponds to the area of the selected hole 53 that aligns with the inlet and outlet openings of the channel.

In the variants in FIG. 17-20, an actuator 11, optionally comprising an electric motor or a manual actuation knob, is active on the rotary selector 50 to determine a rotation of said rotary selector by changing the relative angular position between said lateral wall 51 and body 7 from a first angular position, in which a first one of said holes 53 puts said inner cavity 52 in fluid communication with one between said inlet opening 7a and said outlet opening 7z, to a second angular position, in which a second one between said holes 53 puts said inner cavity 52 in fluid communication with one between said inlet opening 7a and said outlet opening 7z. In this way, the rotation of said selector changes the relative angular position between said lateral wall 51 and body 7 from the first to the second angular position and causes a corresponding switching from a first to a second one between said predetermined values of the geometric characteristic of the orifice.

Going in further detail, the rotary selector 50 comprises an end wall 55 placed transversely at one end of the lateral wall 51, and a main opening 56 axially opposite to the end wall 55. The main opening 56 is delimited by a terminal edge 51a of the lateral wall facing towards the inlet opening 7a of channel 7 and thus allowing a fluid passing from the inlet opening 7a towards the outlet opening 7z to access to the inner cavity 52 first by crossing opening 56 (with no obstacles) and subsequently, crossing at least one of said through holes 53 (which is in substantial alignment with the inlet opening 7a).

As shown, the inlet opening 7a and the outlet opening 7z are arranged substantially coaxially with respect to an ideal axis A passing through the same inlet and outlet openings, while the lateral wall 51 is inserted in a seat 54 formed in body 7 and extending according to a respective development axis B that is inclined with respect to said ideal axis A (and forming an obtuse angle C greater than 100 degrees): in this way, as already mentioned, an ideal arrangement of the main opening 56 is obtained, avoiding tortuous paths for the fluid in transit.

The rotary selector 50 is rotatably mounted in seat 54 defined in body 7, and the terminal edge delimiting the main opening 56 cooperates with an annular abutment defined at the inner wall of channel 7 so that said main opening extends substantially entirely (i.e. by at least 80% of the extension thereof) through the passage gap of channel 7 and in such a way that at least one of said holes can be positioned in a position substantially aligned with said inlet opening 54 and with said main opening 56.

According to a further aspect, the selector comprises a sealing member 57 associated at the end wall 55: moreover, a driving axis 58 angularly integral with the end wall 55 passes through the sealing member 57 and is mechanically connected to actuator 11 to allow an angular rotation of the selector by said actuator.

The sealing member comprises a disc-like cap sealably engaged with one end of seat 54; moreover, the end wall 55 has at least one passage hole or channel 59 (the figure shows 2 by way of example) for putting a pressure relief chamber 60, defined between the end wall 55 and the sealing member 57, in fluid communication with the inner cavity 52 of the lateral wall 51. In this way, the pressure across the end wall is substantially constant and the axial thrust (which creates a resistance to the actuation of the same) reduced to a considerable extent.

Furthermore, according to an aspect, it is possible to provide that the rotary selector is positionable in a plurality of predefined opening positions, at each of which a respective one of said through holes 53 puts the inner chamber in fluid communication with the outlet opening 7z. In addition, the rotary selector can also be placed in at least one closed position, wherein said lateral wall 51 inhibits the passage of fluid between the inlet opening 7a and the outlet opening 7z.

Finally, according to a further aspect of an embodiment of the invention, FIGS. 21 to 23 show a valve 500, in particular with variable passage gap intended for a fluid distribution system, for example for air conditioning and/or heating systems, comprising a main body 7 having at least one inlet opening 7a, at least one outlet opening 7z, and at least one channel 70 that places the inlet opening 7a in fluid communication with the outlet opening 7z. The rotary selector 50 is inserted in (identical to that referred to in FIGS. 17-20) is inserted in such a body and is positionable in a plurality of predefined opening positions, at each of which a respective one of said through holes 53 puts the inner chamber in fluid communication with the outlet opening 7z. In addition, the rotary selector can also be optionally placed in at least one closed position, wherein said lateral wall 51 inhibits the passage of fluid between the inlet opening 7a and the outlet opening 7z. In practice, by actuating the selector with actuator 11, valve 500 can define discrete passages of differentiated area defined by holes 53 or the complete inhibition of the fluid passage. Since the through holes 53 are arranged on the cylindrical lateral wall 51, it is possible, with the same radial dimensions, to obtain a much larger surface available for making the holes compared to the case in which the selector is, for example, a flat disc or a ball.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an air conditioning and/or heating system comprising:
    a main body having an inlet opening, an outlet opening and at least one channel which places the inlet opening in fluid communication with the outlet opening;
    an orifice arranged in said main body and shaped such that when a flow runs through said channel between said inlet opening and said outlet opening, a pressure difference is generated between a first region and a second region within said main body, said first region being located upstream of said orifice, said second region being located downstream of said orifice;
    a pressure meter configured for detecting said pressure difference;
    a variator of at least one geometric characteristic of said orifice, said variator configured to arrange the orifice in a plurality of different configurations, each corresponding to a respective geometric characteristic of the variable orifice, the geometric characteristic comprising one or more of:
        a diameter of said orifice,
        an area of the fluid passage section through said orifice, and
        a profile of said orifice;
    a regulator of a representative quantity of said flow through said orifice;
    a control unit configured to receive a signal indicative of said pressure difference generated by the pressure meter, and configured to drive the variator to arrange the orifice in one of said different configurations, wherein the control unit executes:
        a measurement procedure of a real value of the representative quantity of the flow through said orifice, said representative quantity being the flow rate passing through said channel, and
        a correction procedure to adjust the real value of said representative quantity in response to the real value deviating by more than a fixed limit from a desired value for the representative quantity of the flow through said orifice,
    wherein the measurement procedure of the real value of the representative quantity of the flow through said orifice includes, in a first alternative, the control unit:
        a. receiving the desired value of the representative quantity of flow through said orifice;
        b. establishing whether said desired value falls within a reference range of representative quantities measurable with the orifice in a current configuration of the different configurations;
        c. if said desired value is not within the reference range of the representative quantity, driving the variator to arrange the orifice in another one of the configurations different from the current configuration;
        d. if said desired value falls within the reference range, calculating a real value of the representative quantity as a function of the pressure difference and the geometric feature of said orifice corresponding to said current configuration, or
    the measurement procedure of the real value of the representative quantity of the flow through said orifice comprising includes, in a second alternative, the control unit:

a. calculating a real value of the representative quantity as a function of the pressure difference and the geometric feature of said orifice corresponding to said current configuration;
b. establishing whether said calculated real value falls within the reference range of the representative quantity measurable with the orifice in said current configuration;
c. if said calculated value is not within the reference range of the representative quantity measurable with the orifice in said current configuration, driving the variator to arrange the orifice in another one of the configurations different from the current configuration;
d. if said calculated value is within the reference range of the representative quantity measurable with the orifice in said current configuration, treating said calculated real value as a correct measurement of the real value of the representative quantity of the flow through said orifice;

wherein the correction procedure of the real value of said representative quantity comprises:
comparing the calculated real value with a target value or with said desired value to determine a possible error, and
driving the regulator to increase or decrease the real flow value if said error is, in an absolute value, greater than a fixed threshold;

wherein the control unit is configured to iteratively repeat at least steps b) to c) of the first alternative of the measurement procedure unit said desired value is within the reference range corresponding to the current configuration of the orifice; or wherein the control unit is configured for iteratively repeat steps a) to c) of the second alternative of the measurement procedure until said calculated real value is within the reference range corresponding to the current configuration of the orifice.

2. The assembly according to claim 1 wherein the control unit is further configured for executing the step of establishing, among the plurality of said configurations, the current configuration of said orifice prior to said step of establishing whether said real value, or said desired value, fall within a reference range of the same representative quantity measurable with the orifice in said current configuration.

3. The assembly according to claim 1, wherein said variator is configured for varying the value of said at least one geometric characteristic of said orifice in a discrete manner among a plurality of predefined geometric characteristic values; wherein the geometric characteristic is the area of the fluid passage section through said orifice.

4. The assembly according to claim 3, wherein said variator is configured for varying the area of the fluid passage section through said orifice among a plurality of discrete values gradually increasing from a minimum value to a maximum value.

5. The assembly according to claim 3, wherein said variator comprises a rotary selector rotatably mounted in said main body and acting between the inlet opening and the outlet opening so as to intercept the fluid passing through the channel, said rotary selector comprising:
a lateral wall having an outer cylindrical shape, and
an inner cavity radially delimited by the lateral wall and facing towards said channel,
and wherein:
the lateral wall has through holes passing through the thickness of the lateral wall itself,
the rotary selector is mounted in said main body and is configured to take a plurality of angular positions with respect to said main body, in each of said angular positions a respective one of said through holes putting the inlet opening in flow communication with the outlet opening.

6. The assembly according to claim 5, wherein the through holes comprise a plurality of holes each having a net passage section that is differentiated from that of the other holes, increasing progressively from the smallest to the largest hole proceeding along a development of the lateral wall; and wherein the number of said through holes corresponds to the number of predetermined values of said at least one geometric characteristic.

7. The assembly according to claim 5, wherein the assembly comprises an actuator active on said rotary selector and configured to cause a rotation of said rotary selector by changing the relative angular position between said lateral wall and the main body from a first angular position, in which a first one of said holes puts said inner cavity in fluid communication with one between said inlet opening and said outlet opening, to a second angular position, in which a second one between said holes puts said inner cavity in fluid communication with one between said inlet opening and said outlet opening, and wherein the rotation of said selector which changes the relative angular position between said lateral wall and the main body from the first to the second angular position causes a corresponding switching from a first to a second one between said predetermined values of said at least one geometric characteristic of said orifice.

8. The assembly according to claim 5, wherein said rotary selector comprises:
an end wall placed transversely to one end of the lateral wall, and
a main opening axially opposite to the end wall and delimited by a terminal edge of said lateral wall, said main opening facing towards said inlet opening of the channel and allowing fluid passing from the inlet opening towards the outlet opening to access to the inner cavity and, subsequently, cross at least one of said through holes;
wherein said inlet opening and said outlet opening are coaxially arranged and wherein said lateral wall is inserted in a seat formed in the main body and extending according to a respective development axis that is inclined with respect to said ideal axis.

9. The assembly according to claim 8, wherein the rotary selector is rotatably mounted in said seat defined in the main body, and wherein the terminal edge delimiting the main opening cooperates with an annular abutment defined at the inner wall of the channel so that said main opening extends substantially entirely through the passage gap of the channel and at least one of said holes is positionable in a position substantially aligned with said inlet opening and with said main opening.

10. The assembly according to claim 8, wherein a sealing member is associated at said end wall, wherein a driving axis angularly integral with the end wall passes through said sealing member and is mechanically connected to said actuator to allow an angular rotation of the selector by said actuator.

11. The assembly according to claim 10, wherein the sealing member comprises a disc-like cap sealably engaged with one end of said seat, and wherein said end wall has at least one passage hole for putting a pressure relief chamber, defined between the end wall and the sealing member, in fluid communication with the inner cavity of the lateral wall.

12. The assembly according to claim 5, wherein the rotary selector is configured to be positioned in a plurality of predetermined angular opening positions, at each of which a respective one of said through holes puts the inner chamber in fluid communication with the outlet opening, and in at least one closed position, in which said lateral wall inhibits the passage of fluid between said inlet opening and said outlet opening.

13. The assembly according to claim 1, wherein said variator further comprises a first selector element, a second selector element and an actuator, wherein:
    said first selector element and said second selector element are disc-shaped and are mutually adjacent and substantially coaxial;
    said first selector element is mounted in said main body in a fixed angular position;
    said second selector element is coupled to said actuator, said actuator being suitable for rotating said second selector element with respect to said first selector element;
    an opening is formed on one between said first selector element and said second selector element, holes are formed on the other one between said first selector element and said second selector element, the number of said holes corresponding to the number of predefined values of said at least one geometric characteristic, and
    switching from a first to a second between said predefined values of said at least one geometric characteristic of said orifice being carried out by means of said actuator by a rotation of said second selector element aimed at changing the relative angular position between said second selector element and said first selector element from a first relative angular position, in which said opening is substantially aligned to first of said holes to a second relative angular position, in which said opening is substantially aligned to a second of said holes.

14. The assembly according to claim 1, wherein said main body comprises at least one housing defining an operating seat therein separate from said channel and having at least a first gap and at least a second gap configured for placing the operating seat in fluid communication with said channel, wherein said pressure meter comprises:
    a sealing casing inserted in said operating seat and in turn defining a respective inner volume, said casing being a fluid sealing body made in a single piece;
    a sensitive element accommodated in said casing and dividing the inner volume in said casing at least in a first chamber and a second chamber, a first surface of said sensitive element being directed towards said first chamber, a second surface of said sensitive element being directed towards said second chamber,
    said sensitive element comprising a sheet of electrically conductive material and being configured such that a pressure difference between said first chamber and said second chamber causes the deformation of said sheet and wherein a transducer is connected to the sensitive element and is capable of generating a signal function of the deformation of said sensitive element, and
    a first pressure intake and a second pressure intake being formed on said casing, said first gap being in communication with said first chamber through said first intake and said second gap being in communication with said second chamber through said second intake.

15. An assembly for an air conditioning and/or heating system comprising:
    a main body including an inlet opening, an outlet opening and at least one channel which places the inlet opening in fluid communication with the outlet opening;
    an orifice in said main body and shaped such that when a flow runs through said channel between said inlet opening and said outlet opening, a pressure difference is generated between a first region and a second region within said main body, said first region located upstream of said orifice, and said second region located downstream of said orifice;
    a pressure meter configured to detect said pressure difference;
    a variator configured to change at least one geometric characteristic of said orifice, said variator configured to arrange the orifice in a plurality of different configurations, wherein each of the configurations corresponds to a respective geometric characteristic of the variable orifice, and the geometric characteristic comprising one or more of:
        a diameter of said orifice,
        an area of the fluid passage section through said orifice, and
        a profile of said orifice;
    a regulator of a representative quantity of the flow through said orifice;
    a control unit configured to receive a signal indicative of said pressure difference and drive the variator to arrange the orifice in a selected one of said configurations, wherein the control unit executes:
        a measurement procedure of a real value of the representative quantity of the flow through said orifice, said representative quantity being the flow rate passing through said channel, and
        a correction procedure of the real value of said representative quantity to correct the real value of the representative quantity in response to a deviation in the real value of more than a fixed limit from a desired value for the representative quantity,
    the measurement procedure of the real value of the representative quantity of the flow through said orifice comprising, in a first alternative, the following steps that the control unit is configured to:
        a. receive the desired value of the representative quantity of flow through said orifice;
        b. establish whether said desired value falls within a reference range of the same representative quantity measurable with the orifice in a current configuration of the different configurations, said range being memorized;
        c. if it is established that said desired value is not within the reference range of the same representative quantity measurable with the orifice in said current configuration, drive the variator to arrange the orifice in another one of the different configuration from the current configuration;
        d. if said desired value falls within the reference range of the same representative quantity measurable with the orifice in said current configuration, calculating a real value of the representative quantity as a function of the pressure difference acquired by said pressure meter and as a function of the geometric feature of said orifice corresponding to said current configuration, or
    the measurement procedure of the real value of the representative quantity of the flow through said orifice comprises, in a second alternative, the following steps that the control unit is configured to:
a. calculate a real value of the representative quantity as a function of the pressure difference acquired by said pressure meter and as a function of the geometric feature of said orifice corresponding to said current configuration;
b. establish whether said calculated real value falls within a reference range of the same representative quantity measurable with the orifice in said current configuration;
c. if said calculated value is not within the reference range of the same representative quantity measurable with the orifice in said current configuration, drive the variator to arrange the orifice in another one of the different configuration from the current configuration;
d. if said calculated value is within the reference range of the same representative quantity measurable with the orifice in said current configuration, treating said calculated real value as a correct measurement of the real value of the representative quantity of the flow through said orifice;
wherein the correction procedure of the real value of said representative quantity comprises:
comparing the calculated real value with a target value or with said desired value to determine a possible error, and
driving the regulator to for increasing or decreasing the real flow value if said error is, in absolute value, greater than a fixed threshold;
wherein the control unit is configured for iteratively repeating at least steps b) to c) of the measurement procedure of the real value of the representative quantity according to the first alternative until said desired value is within the reference range of the representative quantity measurable with the orifice in said current configuration; or
wherein the control unit is configured for iteratively repeating steps a) to c) of the measurement procedure of the real value of the representative quantity according to the second alternative until said calculated real value is within the reference range of the representative quantity measurable with the orifice in said current configuration,
wherein said variator comprises a rotary selector rotatably mounted in said main body and acting between the inlet opening and the outlet opening so as to intercept the fluid passing through the channel, said rotary selector comprising:
a lateral wall having an outer cylindrical shape, and
an inner cavity radially delimited by the lateral wall and facing towards said channel, and wherein: the lateral wall has through holes passing through the thickness of the lateral wall itself, and the rotary selector is mounted in said main body and is configured to take a plurality of angular positions with respect to said main body, in each of said angular positions a respective one of said through holes putting the inlet opening in flow communication with the outlet opening, and
wherein the through holes comprise a plurality of holes each having a net passage section that is differentiated from that of the other holes.

16. The assembly according to the preceding claim 15, wherein the control unit is further configured for executing the step of establishing, among the plurality of said configurations, the current configuration of said orifice prior to said step of establishing whether said real value, or said desired value, fall within a reference range of the same representative quantity measurable with the orifice in said current configuration.

17. The assembly according to claim 15, wherein said variator is configured for varying the value of said at least one geometric characteristic of said orifice in a discrete manner among a plurality of predefined geometric characteristic values; wherein the geometric characteristic is the area of the fluid passage section through said orifice,
wherein said variator is configured for varying the area of the fluid passage section through said orifice among a plurality of discrete values gradually increasing from a minimum value to a maximum value.

18. The assembly according to claim 15, wherein the assembly comprises an actuator active on said rotary selector and configured to cause a rotation of said rotary selector by changing the relative angular position between said lateral wall and the main body from a first angular position, in which a first one of said holes puts said inner cavity in fluid communication with one between said inlet opening and said outlet opening, to a second angular position, in which a second one between said holes puts said inner cavity in fluid communication with one between said inlet opening and said outlet opening, and wherein the rotation of said selector which changes the relative angular position between said lateral wall and the main body from the first to the second angular position causes a corresponding switching from a first to a second one between said predetermined values of said at least one geometric characteristic of said orifice.

19. The assembly according to claim 15, wherein said main body comprises at least one housing defining an operating seat therein separate from said channel and having at least a first gap and at least a second gap configured for placing the operating seat in fluid communication with said channel, wherein said pressure meter comprises:
a sealing casing inserted in said operating seat and in turn defining a respective inner volume, said casing being a fluid sealing body made in a single piece;
a sensitive element accommodated in said casing and dividing the inner volume in said casing at least in a first chamber and a second chamber, a first surface of said sensitive element being directed towards said first chamber, a second surface of said sensitive element being directed towards said second chamber,
said sensitive element comprising a sheet of electrically conductive material and being configured such that a pressure difference between said first chamber and said second chamber causes the deformation of said sheet and wherein a transducer is connected to the sensitive element and is capable of generating a signal function of the deformation of said sensitive element, and
a first pressure intake and a second pressure intake being formed on said casing, said first gap being in communication with said first chamber through said first intake and said second gap being in communication with said second chamber through said second intake.

20. The assembly according to claim 15, wherein the net passage section of the holes increases progressively from the smallest to the largest hole proceeding along a development of the lateral wall; and wherein the number of said through holes corresponds to the number of predetermined values of said at least one geometric characteristic.

* * * * *